US011710010B2

(12) United States Patent
McQueen

(10) Patent No.: US 11,710,010 B2
(45) Date of Patent: Jul. 25, 2023

(54) SYSTEM INTEGRATING UI FOR MANUAL INPUT WITH SCANNING OF ENCODED DATA MARKINGS

(71) Applicant: Datalogic USA, Inc., Eugene, OR (US)

(72) Inventor: Alexander M. McQueen, Eugene, OR (US)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 17/715,471

(22) Filed: Apr. 7, 2022

(65) Prior Publication Data

US 2022/0230008 A1 Jul. 21, 2022

Related U.S. Application Data

(63) Continuation of application No. 16/776,445, filed on Jan. 29, 2020, now Pat. No. 11,301,660.

(51) Int. Cl.
*G06K 7/14* (2006.01)
*G06T 7/20* (2017.01)
*G06K 7/10* (2006.01)

(52) U.S. Cl.
CPC ......... *G06K 7/1443* (2013.01); *G06K 7/1417* (2013.01); *G06T 7/20* (2013.01); *G06K 2007/10504* (2013.01); *G06T 2207/20092* (2013.01); *G06T 2207/30204* (2013.01)

(58) Field of Classification Search
CPC ....... G06K 7/1443; G06K 7/1417; G06T 7/20
USPC ................................................... 235/462.09
See application file for complete search history.

(56) References Cited

U.S. PATENT DOCUMENTS

| 5,478,997 | A | 12/1995 | Bridgelall et al. |
| 10,317,989 | B2 | 6/2019 | Rouvinez et al. |
| 10,474,857 | B2* | 11/2019 | Todescato ............ G06K 7/1091 |
| 2009/0247299 | A1 | 10/2009 | Conticello |
| 2012/0111945 | A1* | 5/2012 | Kearney ............ G06K 7/10891 |
| | | | 235/462.11 |
| 2014/0282257 | A1 | 9/2014 | Nixon et al. |
| 2016/0259958 | A1* | 9/2016 | Nara ................ G06K 19/06037 |
| 2018/0167549 | A1 | 6/2018 | Lim et al. |
| 2018/0181199 | A1 | 6/2018 | Harvey et al. |

FOREIGN PATENT DOCUMENTS

EP 1120727 A2 8/2001

* cited by examiner

*Primary Examiner* — Ahshik Kim
(74) *Attorney, Agent, or Firm* — The Juhasz Law Firm

(57) ABSTRACT

A device includes: an image sensor to capture images of an object within an FOV, a guide projector and a processor. The processor is to analyze some of the images to detect entry of an encoded data marking carried by the object into the FOV, and in response to detecting such entry into the FOV: operate the guide projector to project a visual guide onto the object to guide movement of the encoded data marking to a first location indicated by the visual guide within the FOV; analyze more of the images to detect such movement to the first location, and then to a second location within the FOV; and in response to the movement to the second location, interpret the movement to the second location as receipt of manual input; and in response to the manual input, transmit data decoded from the encoded data marking to another device.

20 Claims, 17 Drawing Sheets

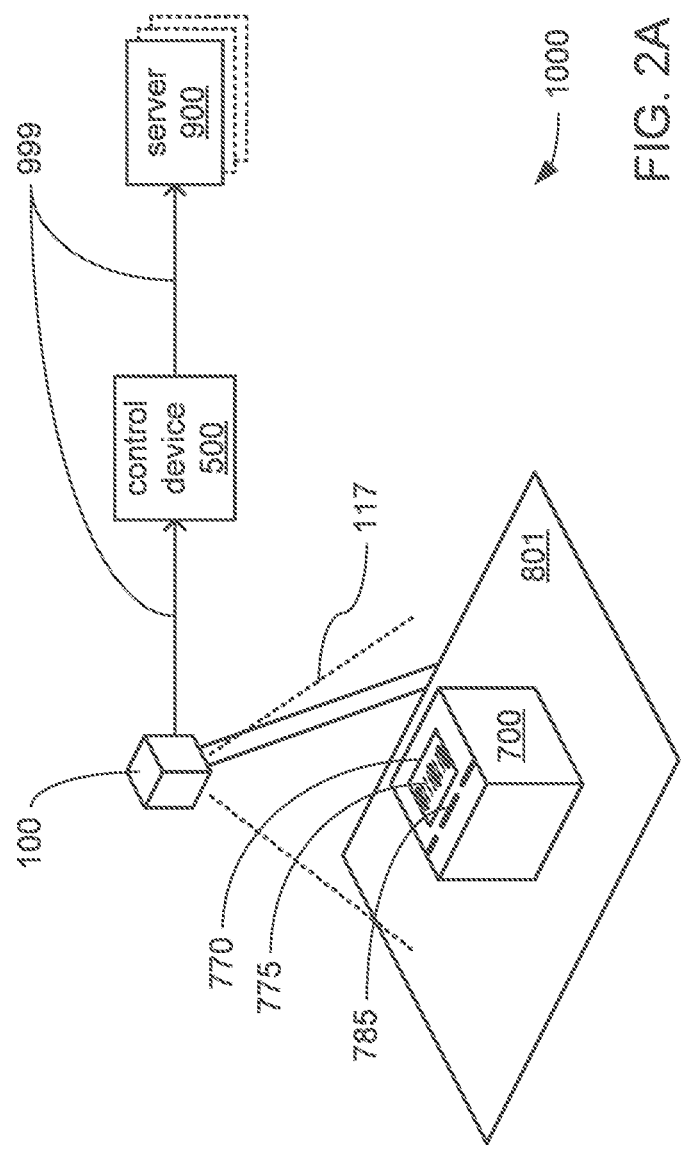

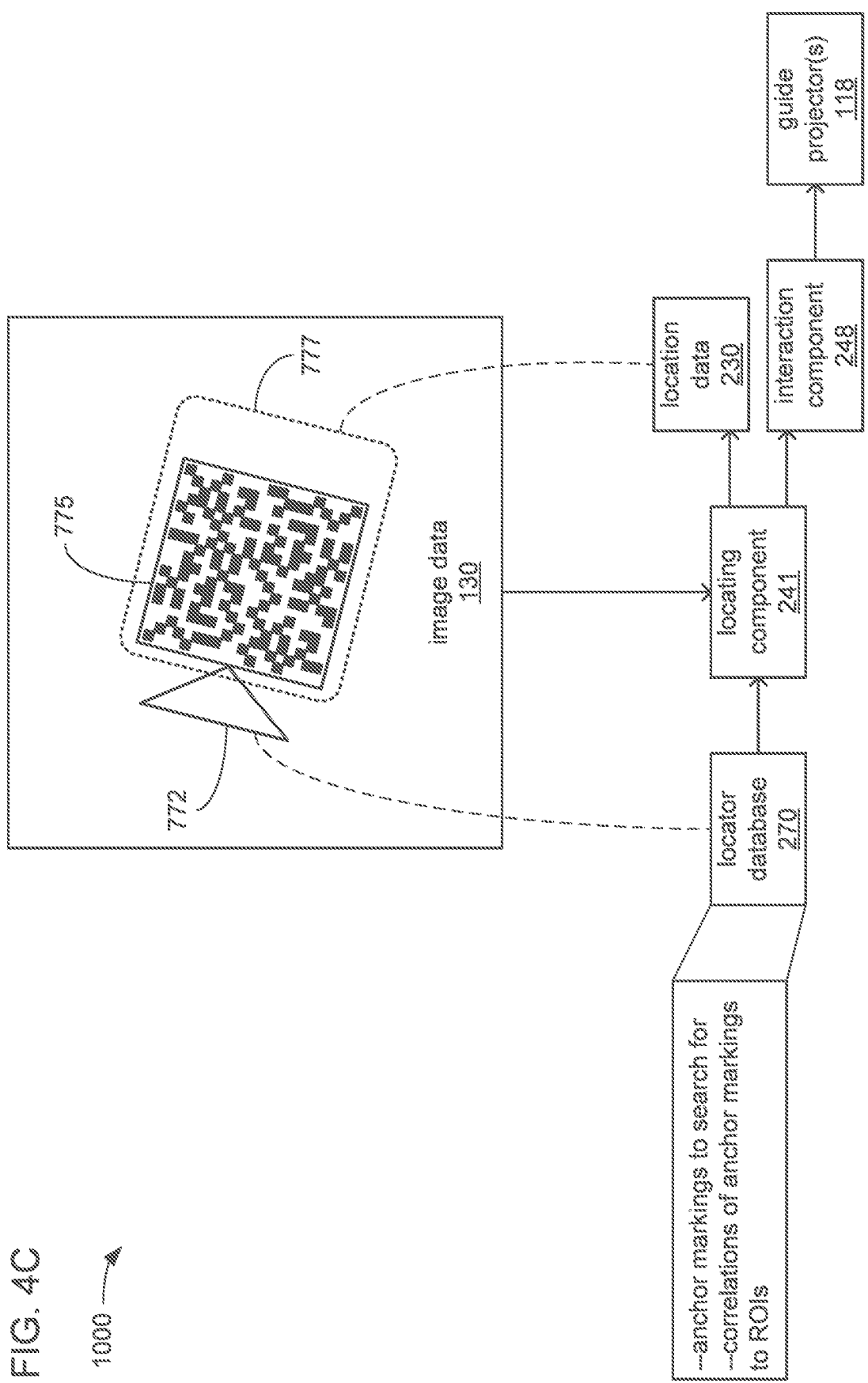

SYSTEM INTEGRATING UI FOR MANUAL INPUT WITH SCANNING OF ENCODED DATA MARKINGS

CLAIM TO PRIORITY

This application claims priority to and the benefit of the following pending application Ser. No. 16/776,445, filed Jan. 29, 2020, entitled, "System Integrating UI for Manual Input with Scanning of Encoded Data Markings;" the contents of the pending application is hereby incorporated by reference in its entirety.

BACKGROUND

1. Technical Field

The present disclosure relates to systems for use in the decode of encoded data markings applied to surfaces of objects.

2. Description of the Related Art

The application of encoded data markings that encode data, such as indicia, digital watermarks and/or human-readable text, to a surface of an object for subsequent capture and decoding to retrieve data encoded therein is well known. Also well known is the use of a scanning device to capture an image of such a surface in an effort to capture an image of one or more encoded data markings for decoding. Further well known is the use of such markings, together with such capturing and decoding thereof, in organizing such activities as the transport, storage and inventorying of objects in various industries.

Such a scanning device may be maintained at a location at which an object bearing one or more of such encoded data markings may be stored and/or through which such an object may be transported. By way of example, such a scanning device may be positioned to place a doorway or portion of the interior of a warehouse within its field of view (FOV) to enable the capture of one or more encoded data markings carried on a surface of an object (e.g., a box, a crate, a palletized load, etc.) as the object is transported into the warehouse, is stored within the portion of the warehouse, and/or is transported out of the warehouse. By way of example, such a scanning device may be positioned over a table or other support surface atop which objects are placed for preparation for storage and/or transport. Alternatively or additionally, such a scanning device may be carried on the body of a member of personnel of a warehouse, transportation facility and/or other location at which objects are stored and/or through which objects are transported.

As will be familiar to those skilled in the art, as objects are in some way handled by personnel during storage, inventorying and/or transport, occasions may arise in which personnel may need to manually provide input concerning one or more aspects of those objects, including input concerning the destination and/or other type of disposition of one or more of those objects, input concerning the current condition of one or more of those objects, etc. As will also be familiar to those skilled in the art, it is generally seen as desirable to minimize the amount of time and/or effort that personnel must expend to provide such input, as each instance of doing so typically involves a refocusing of attention away from the task that is currently underway to interact with a user interface (UI) of some form provided by a device to accept such input. More specifically, such refocusing often entails movement of hands and eyes of personnel away from interacting with the objects to interacting with such a UI. Then, when such interaction with the UI is complete, there is the corresponding refocusing of attention back to that task.

Various approaches have been taken in the prior to minimize the amount of time and/or effort consumed by such refocusing, including numerous efforts at simplifying UI design. However, such efforts, while successful in minimizing such refocusing, have failed to entirely eliminate it. Thus, a system able to accept input from personnel concerning objects that are being scanned, while further minimizing and/or eliminating the need for such refocusing of attention, is needed.

BRIEF SUMMARY

Technologies are described for enabling more efficient manual entry of input concerning objects that carry encoded data markings by personnel involved in the scanning of those of encoded data markings, where the UI by which such input is manually entered is incorporated into the operation of the scanning device employed in such scanning.

A devices includes an image sensor configured to capture multiple images of an object present within a field of view (FOV) of the image sensor; storage configured to store image data representing the multiple images; at least one guide projector configured to project a visual guide onto a surface of the object using light; and a processor coupled to the at least the storage and the at least one guide projector. The processor is configured to analyze a first subset of the multiple images to detect entry of an encoded data marking carried by the object into the FOV. In response to the detection of entry of the encoded data marking into the FOV, the processor is further configured to: operate a first guide projector of the at least one guide projector to project a first visual guide onto a surface of the object to guide movement of the object to cause the encoded data marking to be moved to a first location indicated by the first visual guide within the FOV; analyze a second subset of the multiple images to detect movement of the encoded data marking to the first location, and then to a second location within the FOV; and in response to the detection of movement of the encoded data marking to the first location, and then to the second location, the processor is further configured to interpret the movement of the encoded data marking from the first location to the second location as receipt of a first manual input, and in response to the receipt of the first manual input, transmit data decoded from the encoded data marking to a first other device via a network.

A decoding system includes a scanning device, wherein the scanning device includes an image sensor configured to capture multiple images of an object present within a field of view (FOV) of the image sensor, and at least one guide projector configured to project a visual guide onto a surface of an object using light. The scanning device is configured to analyze a first subset of the multiple images to detect entry of an encoded data marking carried by the object into the FOV. In response to the detection of entry of the encoded data marking into the FOV, the scanning device is further configured to: operate a first guide projector of the at least one guide projector to project a first visual guide onto a surface of the object to guide movement of the object to cause the encoded data marking to be moved to a first location indicated by the first visual guide within the FOV; and analyze a second subset of the multiple images to detect movement of the encoded data marking to the first location, and then to a second location within the FOV. The decoding system also includes a control device coupled to the scanning device and comprising a processor. The processor is configured to receive, from the scanning device, an indication of the detection of movement of the encoded data marking to the first location, and then to the second location. In response to the movement of the encoded data marking to the first location, and then to the second location, the processor is further configured to: interpret the movement of the encoded data marking from the first location to the second location as receipt of a first manual input; and in response to the receipt of the first manual input, transmit data decoded from the encoded data marking to a first other device via a network.

A method includes analyzing a first subset of multiple images captured by an image sensor of a scanning device to detect entry of an encoded data marking carried by an object into a field of view (FOV) of the image sensor. The method also includes, in response to the detection of entry of the encoded data marking into the FOV, performing operations including: to guide movement of the object to cause the encoded data marking to be moved to a first location within the FOV, perform at least one of operating a first guide projector of the scanning device to use light to project a first projected visual guide onto a surface of the object or operating a first light-emitting component of the scanning device to provide a first non-projected visual guide at a position about a periphery of the FOV; and analyzing, by a processor, a second subset of the multiple images to detect movement of the encoded data marking to the first location, and then to a second location within the FOV. The method further includes, in response to the detection of entry of the encoded data marking into the FOV and in response to the detection of movement of the encoded data marking to the first location, and then to the second location, performing operations including: interpreting, by the processor, the movement of the encoded data marking from the first location to the second location as receipt of a first manual input; and in response to the receipt of the first manual input, correlating the first manual input to a first operation, and performing the first operation, wherein the first operation comprises transmitting, from the processor, data decoded from the encoded data marking to a first device via a network.

BRIEF DESCRIPTION OF THE DRAWINGS

FIGS. 2A and 2B show aspects of alternate example uses of the decoding system of either of FIG. 1A or 1B.

FIGS. 4A, 4B, 4C, 4D, 4E, 4F, 4G and 4H, together, show aspects of the operation of the decoding system of either of FIG. 1A or 1B to decode data from an encoded data marking and to interpret manual input from movement of the encoded data marking within a field of view (FOV).

DETAILED DESCRIPTION

Figure 1A:
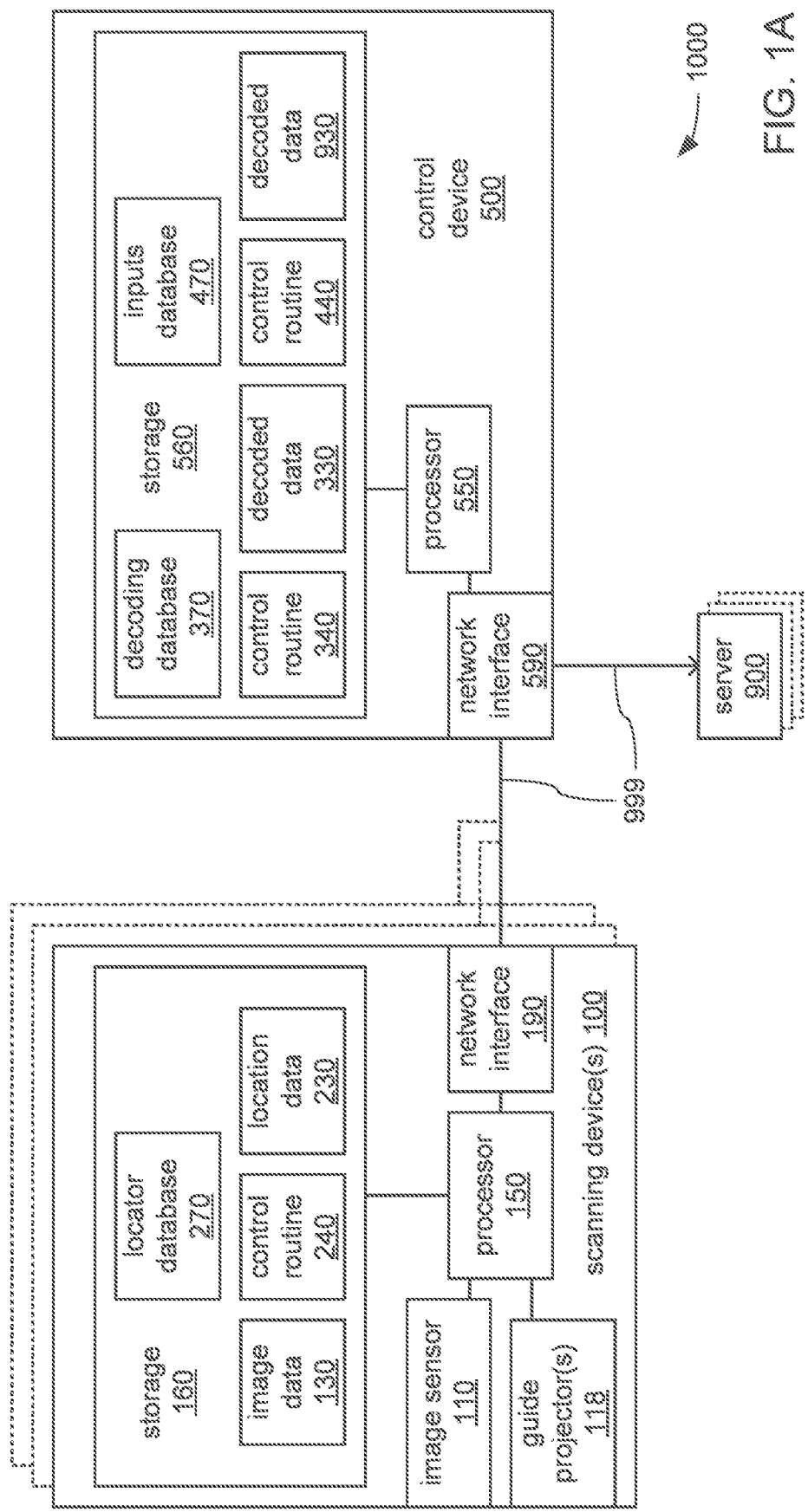
FIGS. 1A and 1B show aspects of alternate example implementations of an indicia decoding system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system to enable more efficient manual entry of input concerning objects that carry encoded data markings by personnel involved in the scanning of those of encoded data markings, and to do so by incorporating the UI by which such input is manually entered into the operation of the scanning device employed in such scanning.

A devices includes an image sensor configured to capture multiple images of an object present within a field of view (FOV) of the image sensor; storage configured to store image data representing the multiple images; at least one guide projector configured to project a visual guide onto a surface of the object using light; and a processor coupled to the at least the storage and the at least one guide projector. The processor is configured to analyze a first subset of the multiple images to detect entry of an encoded data marking carried by the object into the FOV. In response to the detection of entry of the encoded data marking into the FOV, the processor is further configured to: operate a first guide projector of the at least one guide projector to project a first visual guide onto a surface of the object to guide movement of the object to cause the encoded data marking to be moved to a first location indicated by the first visual guide within the FOV; analyze a second subset of the multiple images to detect movement of the encoded data marking to the first location, and then to a second location within the FOV; and in response to the detection of movement of the encoded data marking to the first location, and then to the second location, the processor is further configured to interpret the movement of the encoded data marking from the first location to the second location as receipt of a first manual input, and in response to the receipt of the first manual input, transmit data decoded from the encoded data marking to a first other device via a network.

A decoding system includes a scanning device, wherein the scanning device includes an image sensor configured to capture multiple images of an object present within a field of view (FOV) of the image sensor, and at least one guide projector configured to project a visual guide onto a surface of an object using light. The scanning device is configured to analyze a first subset of the multiple images to detect entry of an encoded data marking carried by the object into the FOV. In response to the detection of entry of the encoded data marking into the FOV, the scanning device is further configured to: operate a first guide projector of the at least one guide projector to project a first visual guide onto a surface of the object to guide movement of the object to cause the encoded data marking to be moved to a first location indicated by the first visual guide within the FOV; and analyze a second subset of the multiple images to detect movement of the encoded data marking to the first location, and then to a second location within the FOV. The decoding system also includes a control device coupled to the scanning device and comprising a processor. The processor is configured to receive, from the scanning device, an indication of the detection of movement of the encoded data marking to the first location, and then to the second location. In response to the movement of the encoded data marking to the first location, and then to the second location, the processor is further configured to: interpret the movement of the encoded data marking from the first location to the second location as receipt of a first manual input; and in response to the receipt of the first manual input, transmit data decoded from the encoded data marking to a first other device via a network.

A method includes analyzing a first subset of multiple images captured by an image sensor of a scanning device to detect entry of an encoded data marking carried by an object into a field of view (FOV) of the image sensor. The method also includes, in response to the detection of entry of the encoded data marking into the FOV, performing operations including: to guide movement of the object to cause the encoded data marking to be moved to a first location within the FOV, perform at least one of operating a first guide projector of the scanning device to use light to project a first projected visual guide onto a surface of the object or operating a first light-emitting component of the scanning device to provide a first non-projected visual guide at a position about a periphery of the FOV; and analyzing, by a processor, a second subset of the multiple images to detect movement of the encoded data marking to the first location, and then to a second location within the FOV. The method further includes, in response to the detection of entry of the encoded data marking into the FOV and in response to the detection of movement of the encoded data marking to the first location, and then to the second location, performing operations including: interpreting, by the processor, the movement of the encoded data marking from the first location to the second location as receipt of a first manual input; and in response to the receipt of the first manual input, correlating the first manual input to a first operation, and performing the first operation, wherein the first operation comprises transmitting, from the processor, data decoded from the encoded data marking to a first device via a network.

Figure 1B:
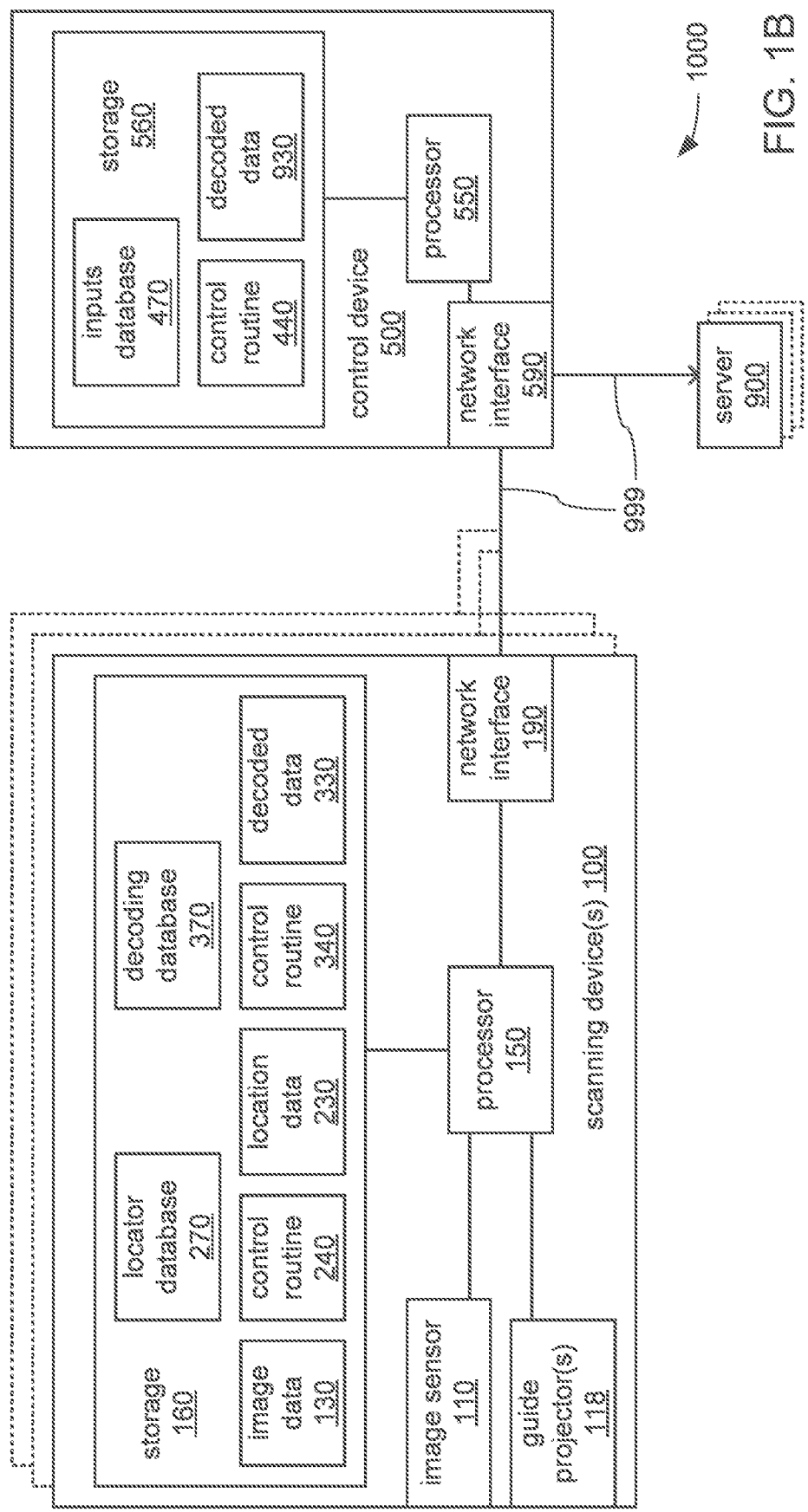

FIGS. 1A and 1B depict aspects of two different example embodiments of a decoding system 1000 that may include one or more scanning devices 100 coupled by a network 999 (e.g., cable-based and/or wireless links interconnecting devices) to a control device 500 and/or still another device, such as the depicted one or more servers 900. In the decoding systems 1000 depicted in each of FIGS. 1A and 1B, and as will be explained in greater detail, each of the one or more scanning devices 100 may cooperate with the control device 500 through the network 999 to capture and decode images of encoded data markings carried on surface (s) of objects, such as indicia, digital watermarks and/or human-readable text. Following such decoding, the control device 500 may further transmit the decoded data to another device, such as one of the one or more servers 900 via the network 999. Additionally, in each of FIGS. 1A and 1B, and as will also be explained in greater detail, each of the one or more scanning devices 100 may cooperate with the control device 500 through the network 999 to interpret instances of one or more specific movements of such encoded data markings within the field of view (FOV) thereof. Following such interpreting, the control device 500 may take any of a variety of predetermined actions that correspond to such interpreted movements, which may include the transmission of the decoded data and/or corresponding commands to a selected one of the one or more servers 900 via the network 999.

Turning more specifically to FIG. 1A, each of the one or more scanning devices 100 may include an image sensor 110, one or more guide projectors 118, a processor 150, a storage 160 and/or a network interface 190 to provide coupling to the network 999. The processor 150 may incorporate one or more core components, one or more graphics processing unit (GPU) components, and/or one or more single-instruction multiple-data (SIMD) components to provide any of a variety of processing architectures for performing any of a variety of operations. The storage 160 may store one or more of image data 130, location data 230, a control routine 240, and decoded data 230. Within each of the one or more scanning devices 100, the image sensor 110, the one or more guide projectors 118, the storage 160 and/or the network interface 190 may each be communicatively coupled to the processor 150 to exchange data therewith through the exchange of electrical, optical, magnetic and/or other signals through one or more buses and/or other form of interconnect.

The control device 500 may include a processor 550, a storage 560 and a network interface 590 to couple the control device 500 to the network 999. The processor 550 may incorporate one or more core components, one or more graphics processing unit (GPU) components, and/or one or more single-instruction multiple-data (SIMD) components to provide any of a variety of processing architectures for performing any of a variety of operations. The storage 560 may store one or more of decoded data 330, a control routine 340, a decoding database 370, a control routine 440, an inputs database 470, and decoded data 930. Within the control device 500, the storage 560 and/or the network interface 590 may each be communicatively coupled to the processor 550 to exchange data therewith through the exchange of electrical, optical, magnetic and/or other signals through one or more buses and/or other form of interconnect.

Each of the control routines 240, 340 and 440 may incorporate a sequence of instructions operative on corresponding ones of the processors 150 and 550 to implement logic to perform various functions. As will be explained in greater detail, in different embodiments, such as the differing embodiments depicted in FIGS. 1A and 1B, different ones of the processors 150 and 550 may be employed in executing different portions of, and/or different ones of, the control routines 240, 340 and 440 to perform different ones of those various functions.

Turning again more specifically to FIG. 1A, within each of the one or more scanning devices 100, in executing the control routine 240, the processor 150 may be caused to operate the image sensor 110 to recurringly capture images of whatever may be within the FOV thereof, and may temporarily store representations of those captured images within the storage 160 as the image data 130. In some embodiments, the processor 150 may incorporate, or be otherwise accompanied by, a direct memory access (DMA) component (not specifically shown) that may be more capable of more efficiently transferring the data representing images captured by the image sensor 110 from the image sensor and into the storage 160 as the image data 130.

The processor 150 may then be further caused by the control routine 240 to analyze each of the captured images within the image data 130 to detect at least the presence of an encoded data marking therein that may be carried on a portion of a surface of an object that may also be present therein. As will be familiar to those skilled in the art, in some embodiments, such an analysis may entail searching the entirety of each captured image for the presence of the encoded data marking, directly. Depending on the complexity of the encoded data marking, such a direct search therefor may require the provision of considerable processing resources by the processor 150. However, as will also be familiar to those skilled in the art, in alternate embodiments where the processor 150 is not able to provide such considerable processing resources, such an analysis may alternately entail searching the entirety of each captured image for the presence of an anchor marking therein that accompanies and provides an indication of the location of a region of interest (ROI) relative to the anchor marking within which the corresponding encoded data marking may be present on a surface of an object.

Upon either directly detecting the presence of the encoded data marking within the FOV or upon detecting the presence of at least such an anchor marking within the FOV, the processor 150 may be further caused by the control routine 240 to operate the one or more guide projectors 118 to project one or more luminous visible guides onto one or more surfaces of the object. As will be explained in greater detail, such visible guides may be so projected to at least initially guide a person in moving the object relative to the scanning device 100, and/or in moving the scanning device 100 relative to the object, to cause the encoded data marking to be moved into a portion of the FOV that falls within a zone of multiple zones within the FOV that is deemed to be a starting point for what may be one or more subsequent movements of the encoded data marking within the FOV that may serve as a mechanism to enable manual input by the person.

Also upon detecting the presence of the encoded data marking or such a corresponding anchor marking, and/or throughout such guided movement of the encoded data marking within the FOV, the processor 150 may be caused to generate the location data 230 to include indications of the changing location of the encoded data marking within FOV. The processor 150 may also be caused to operate the network interface 190 to transmit, via the network 999 and to the control device 500, at least a portion of the image data 130 that includes captured images within which the encoded data marking was detected and/or at least a corresponding portion of the location data 230 that includes indications of the location of the encoded data marking (or of the ROI, where the encoded data marking is not directly tracked) within each of those captured images.

Within the control device 500, in executing the control routine 340, the processor 550 may be caused to operate the network interface 590 to receive, via the network 999 and from the scanning device 100, the transmitted image data 130 and/or the location data 230 conveying captured image (s) in which the encoded data marking is detected as it is caused by the person to be moved about within the FOV as a result the person using the one or more projected guides to move the encoded data marking to the starting position within one of the zones, as well as to cause further movement from the starting position to provide manual input. The processor 550 may be further caused by the control routine 340 to use the indications of the location of the encoded data marking (or of the ROI) within each of those images to decode the encoded data therein. The processor 550 may be caused to store the decoded data as the decoded data 330.

The processor 550 may be further caused by the control routine 340 to analyze the received indications of the changing location of the encoded data marking within those images over the period of time covered by those images to identify one or more movements of the encoded data marking that represent manual input. As will be discussed in greater detail, the visual guides projected onto the object may also provide guidance of the current relative location of the encoded data marking to one or more locations within one or more zones, and/or how to move the encoded data marking among locations within different zones defined within the FOV to create particular movements of the encoded data marking within the FOV that are interpreted as providing one or more possible manual inputs. The processor 550 may be caused to store an indication of the interpreted manual input as part of the decoded data 930, along with data decoded from the encoded data marking.

Upon identifying one or more of such movements that are interpretable as such manual input, the processor 550 may, in executing instructions of the control routine 440, be caused to take any of a variety of pre-selected actions associated with the data decoded from the encoding data marking. By way of example, the manual input may be indicative of a selection of a task to be performed with the data decoded from the encoded data marking, and the processor 550 may be caused to operate the network interface 590 to transmit the data decoded from the encoded data marking and/or the results of the performance of that task to one of the one or more servers 900 via the network 999. By way of another example, the manual input interpreted from the movements of the encoded data marking may be intended to be manual input for use by one of the servers 900 (e.g., one or more commands to be relayed to that server 900), and the processor 550 may be caused to operate the network interface 590 to transmit an indication of that manual input (or an interpretation of it) to that server 900, along with the data decoded from the encoded data marking. By way of still another example, the processor 550 may be caused to operate the network interface 590 to transmit the decoded data 930 to a particular one of the one or more servers 900 via the network 999, where the particular one of the one or more servers 900 is selected by the manual input interpreted from the movements of the encoded data marking.

Turning more specifically to FIG. 1B, the embodiment of the decoding system 1000 of FIG. 1B may be substantially similar to the decoding system 1000 of FIG. 1A. However, a substantial difference therebetween may be that, in the embodiment of the decoding system 1000 of FIG. 1B, the processor 150 of each of the one or more scanning devices 100 may execute the control routine 340, instead of the processor 550 of the control device 500 doing so. Thus, the processor 150 within each of the one or more scanning devices 100 may be provided with the ability to, itself, confirm the presence of an encoded data marking within an ROI, and/or to, itself, decode the encoded data therein. In such an embodiment, the processor 150 may be caused by the control routine 340 to operate the network interface 190 to transmit the location data 230 indicating detected movements of an ROI or encoded data marking along with the decoded data 330 that includes the data decoded from the encoded data marking to the control device 500 via the network. In this way, the processor 550 of the control device 500 is still able to interpret the manual input from the indications of movement through multiple captured images over time provided in the location data 230, and is still able to correlate such manual input to one or more predetermined actions.

It should be noted that, despite the depiction in FIGS. 1A and 1B of two different specific embodiments of the decoding system 1000 in which various functions are depicted and discussed as being split between the one or more scanning devices 100 and the control device 500, other embodiments are possible in which each scanning device 100 of the one or more scanning devices 100 may incorporate the functionality of both the scanning device 100 and the control device 500. Thus, in such other embodiments, each scanning device 100 of the one or more scanning devices 100 may, independently of each other, perform the detection of the entry of an encoded data marking 775 into the FOV 117, the decoding of the encoded data marking 775, the interpretation of manual input(s) from the movement of the encoded data marking 775 within the FOV 117, and at least the transmission of the decoded data 930 relaying indications of the data decoded from the encoded data marking 775 and/or the interpreted movement(s) to one or more other devices (e.g., one or more of the servers 900). Additionally, in such embodiments, each scanning device 100 of the one or more scanning devices 100 may also be capable of directly performing various operations on the data decoded from encoded data marking prior to the transmission of that data as part of the decoded data 930 to one or more other devices.

It should also be noted that, in alternate embodiments of the decoding system 1000, the one or more guide projectors 118 within each of the one or more scanning devices 100 may be replaced or augmented with a display (not specifically shown) that provides a view of what is visible to the image sensor 110 within the FOV 117, with such a view being augmented by the overlay of one or more non-projected visual guides over that view. Thus, instead of, or in addition to, projecting one or more visual guides onto surface(s) of the object, itself, an "augmented reality" view of the object may be provided by which a person is guided in how to move the object relative to the scanning device 100 while looking at the object through the combination of the image sensor 110 and such a display. Also as an alternative to, or in addition to, the projection of one or more visual guides onto surface(s) of the object, itself, one or more portions of each of the one or more scanning devices 100 may carry one or more light-emitting components at positions about the periphery of the FOV 117 and/or about the periphery of where an object is expected to be positioned within the FOV 117 to enable scanning of an encoded data marking 775. Such one or more light-emitting components about the periphery may be selectively illuminated upon detection of entry of the encoded data marking 775 into the FOV 117 (in lieu of or in addition to the projection of projected visual guides onto surface(s) of the object) to provide a non-projected visual guide to guide movement of the object to cause the encoded data marking 775 to be moved to the starting point within the FOV 117.

Referring now to both FIGS. 1A and 1B, the image sensor 110 within each of the one or more scanning devices 100 may be based on any of a variety of technologies and may employ any of a variety of optical scanning and/or other image capturing techniques to capture an image of encoded data markings (e.g., indicia, digital watermarks and/or text) carried by a portion of an object. More specifically, the image sensor 110 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings.

In some embodiments, the image sensor 110 may additionally incorporate, or be otherwise accompanied by, any of a variety of optical components (e.g., lenses, mirrors, color-adjusting gels, etc.—not specifically shown) that may manipulate the light arriving at the image sensor 110 from within the FOV in any of a variety of ways before it reaches the light sensing components of the image sensor 110. Alternatively or additionally, the image sensor 110 may additionally incorporate, or be otherwise accompanied by, any of a variety of illumination components (e.g., broad spectrum light sources, single frequency light sources, collimated light sources, etc.—not specifically shown) that may serve to illuminate a surface of an object within the FOV in a manner that enhances the ability of the image sensor 110 to capture an image of a portion of that surface of that object.

Each of the one or more guide projectors 118 within each of the one or more scanning devices 100 may emit various forms of collimated and/or monochromatic light, including light that projects the visual guides onto a surface of an object that carries one or more encoded data markings.

The object onto which one or more encoded data markings may be applied may be any of a variety of objects, including and not limited to, a package carrying a shipping label that includes encoded data marking(s), or a product for sale within retail packaging on which encoded data marking (s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale.

Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

Each of the storages 160 and 560 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each of the processors 150 and 550 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processors 150 and 550 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 190 and 590 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 190 and 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2B:
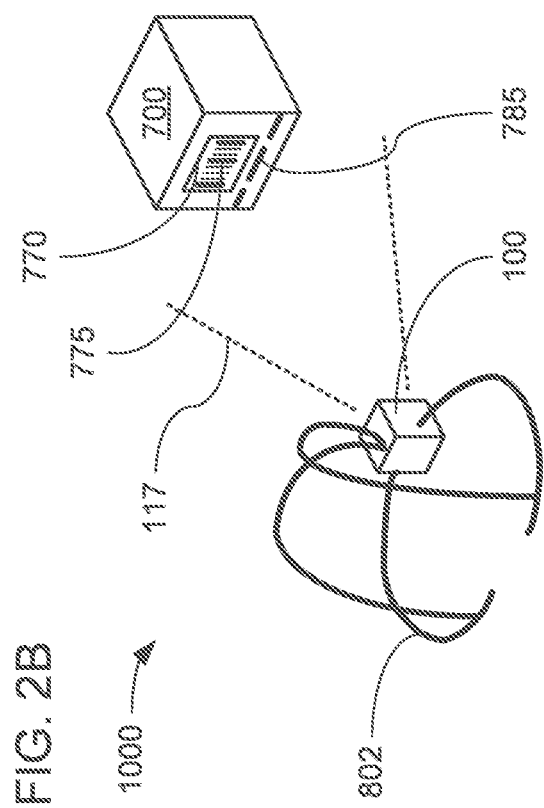

FIGS. 2A and 2B depict aspects of two different examples of use of the decoding system 1000 of either of FIG. 1A or 1B in capturing and decoding encoded data markings 775 that may be applied to a surface of an object 700, as well as in accepting manual input in the form of one or more predetermined movements of the encoded data markings 775 within the FOV 117 of a scanning device 100.

Turning to FIG. 2A, the depicted example implementation of the decoding system 1000 includes one scanning device 100 rigidly attached by an arm or other mechanical linkage to a support surface 801 (e.g., a table, a countertop, checkstand, kiosk, etc.), and with the scanning device 100 oriented to cause its FOV 117 to be directed downward toward the upwardly facing support surface 801. However, it should be noted that other variations of rigid mounting of the scanning device 100 are possible in which there may not be a support surface 801 on which to set objects 700 and/or in which objects 700 may be supported in any of a variety of other ways, including and not limited to, being affixed to a vertical support surface and/or to a support surface in any of a variety of other orientations. Personnel making use of the system 1000 to scan the encoded data markings 775 carried by objects 700 may place each such object 700 on the support surface 800 in a position and orientation that causes a surface thereof on which an encoded data marking 775 is carried to face upwards towards the scanning device 100 and to be within the FOV 117. As depicted, the object 700 may be a box having a surface to which a label 770 that carries the encoded data marking 775 has been affixed. However, it should be noted that the object 700 may be any of a variety of other objects having one or more surfaces on which one or more encoded data markings 775 may be carried in any of a variety of ways.

As previously discussed, in response to the detection of the encoded data marking 775 and/or a corresponding anchor marking (not shown) within the FOV 117, the one or more guide projectors 118 within the scanning device 100 may project one or more visual guides 785 onto the same surface of the object 700 to guide a person handling the object 700 in moving the object 700 about on the support surface 801 to position the encoded data marking 775 at a starting point relative to and/or indicated by the one or more visual guides 785. Following such movement toward the starting point, the person handling the object 700 may subsequently move the object about on the support surface 801 to move the position of the encoded data marking 775 within the FOV 117, and relative to the one or more visual guides 785, in a manner that may be interpreted as providing manual input.

Turning to FIG. 2B, the depicted example implementation of the decoding system 1000 includes one scanning device 100 attached to a harness 802 that enables a person (not shown) to carry the scanning device 100 on a portion of their torso, with the scanning device 100 oriented to cause its FOV 117 to be directed outward away from the harness 802 and the front of the person's torso. Such a person making use of the system 1000 to scan the encoded data markings 775 carried by objects 700 may hold each such object 700 with their hands in front of their torso in a position and orientation that causes a surface thereof on which an encoded data marking 775 is carried to face towards the scanning device 100 (i.e., towards the front of their torso) and to be within the FOV 117. Again, as depicted, the object 700 may be a box having a surface to which a label 770 that carries the encoded data marking 775 has been affixed. However, it should again be noted that the object 700 may be any of a variety of other objects having one or more surfaces on which one or more encoded data markings 775 may be carried in any of a variety of ways.

Again, in response to the detection of the encoded data marking 775 and/or a corresponding anchor marking (not shown) within the FOV 117, the one or more guide projectors 118 within the scanning device 100 may project one or more visual guides 785 onto the same surface of the object 700 to guide the person holding the object 700 in moving the object 700 relative to their torso to position the encoded data marking 775 at a starting point relative to and/or indicated by the one or more visual guides 785. Following such movement toward the starting point, the person holding the object 700 may subsequently move the object again relative to their torso to move the position of the encoded data marking 775 within the FOV 117, and relative to the one or more visual guides 785, in a manner that may be interpreted as providing manual input.

It should be noted that these depictions of example uses of the decoding system 1000 in FIGS. 2A and 2B are but two possible examples provided herein for purposes of illustration, and should not be taken as limiting. Stated differently, other uses of other implementations of the decoding system 1000 are possible in which the object 700 may be any of a variety of objects other than a box or package, and/or in which the scanning device 100 may be moved about relative to the object 700 to move an encoded data marking 775 relative to the one or more visual guides 785, instead of the object 700 being moved.

By way of example, despite the specific depiction in FIG. 2B of the scanning device 100 being carried on a torso of a person, other embodiments are possible in which the scanning device 100 may be carried on one or more other portions of a person's body (e.g., as a wearable device in which the scanning device 100 may be worn on a wrist, a finger, on a shoulder, on the head, etc.). As a more specific example, the scanning device 100 may integrated into a monocle, a pair of glasses or any of a variety of other forms of headwear. As another more specific example, the scanning device 100 may be integrated into a wristwatch or other form of wearable device carried on or near one hand, thereby allowing movement, within the FOV 117, of an encoded data marking 775 carried by an object in the other hand by moving either or both hands in a coordinated manner.

Figure 3:
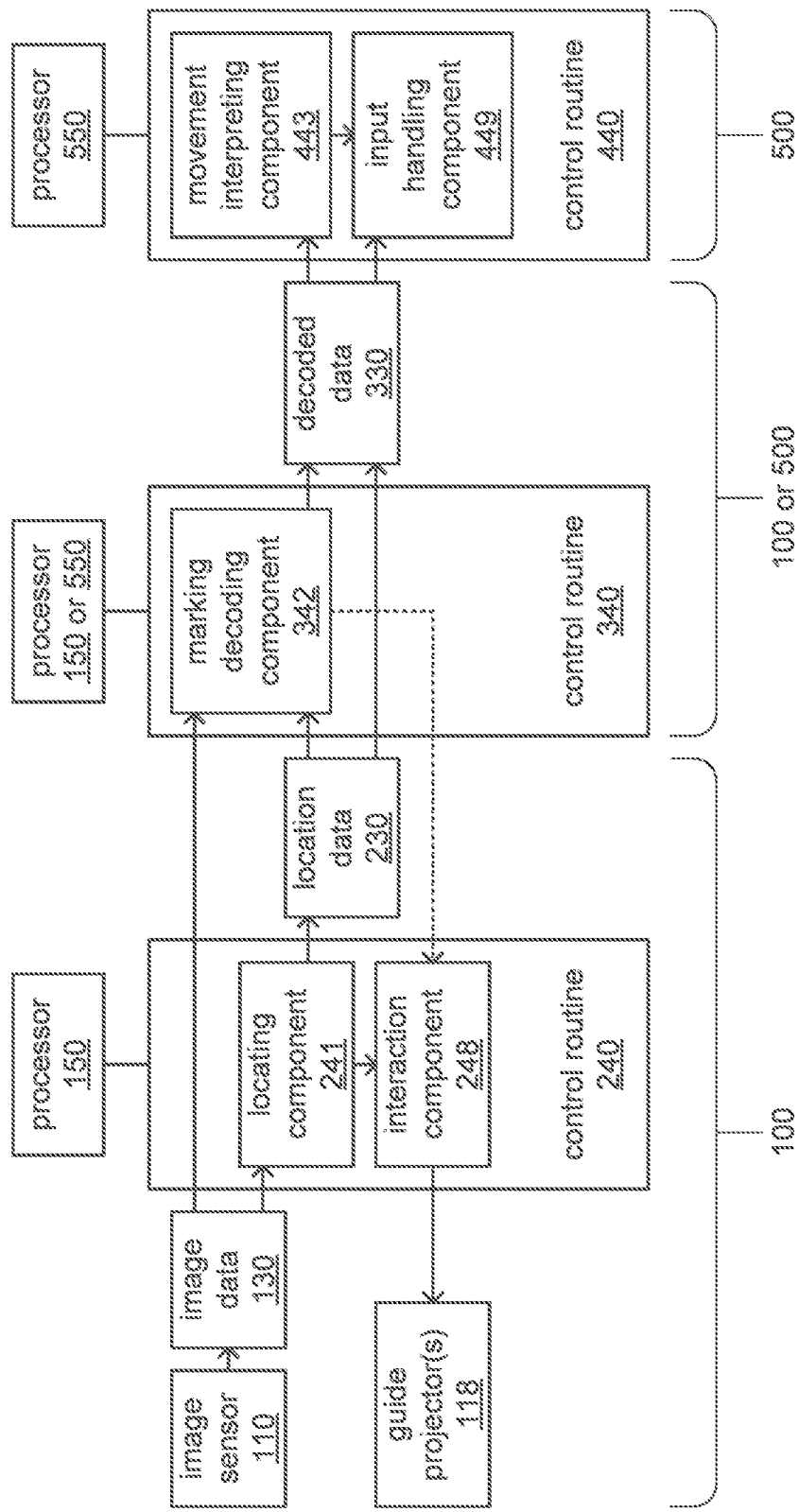
FIG. 3 shows aspects of an example internal architecture of the decoding system of either of FIG. 1A or 1B.

FIG. 3 depicts aspects of an example embodiment of an internal architecture of the decoding system 1000. As previously discussed, different ones of the control routines 240, 340 and 440 may be executed by different ones of the processor(s) 150 of the one or more scanning devices 100 and the processor 550 of the control device 500.

As depicted, each of the control routines 240, 340 and 440 may incorporate one or more distinct components that each include executable instructions that cause a processor to perform one or more distinct functions when executed. More specifically, the control routine 240 may include a locating component 241 that may cause a processor (e.g., the processor 150 within each of the one or more scanning devices 100) to analyze captured images to detect anchor markings, and/or to identify corresponding region(s) of interest (ROIs) at which one or more encoded data markings may be present within the FOV 117 covered by the captured image. Alternatively or additionally, the control routine 240 may include an interaction component 248 that, in response to various indications of one or more ROIs and/or markings having been detected within the FOV 117, may cause the operation of the one or more guide projectors 118 to project one or more visual guides 785 onto surface(s) of the object 700 that is within the FOV 117.

The control routine 340 may include a marking decoding component 342 that may cause a processor (e.g., either the processor 150 within each of the one or more scanning devices 100, or the processor 550 within the control device 500) to analyze ROIs that are caused to be identified by the locating component 241 within captured images to confirm the presence of encoded data marking(s) therein, and/or to decode the data encoded within such encoded data marking(s). The control routine 440 may include a movement interpreting component 443 that may cause a processor (e.g., the processor 550 within the control device 500) to analyze the movement of a confirmed encoded data marking within the FOV 117 over time through multiple captured images to interpret manual inputs provided through such movement. Alternatively or additionally, the control routine 440 may include an input handling component 449 that, in response to such manual input having been interpreted, causes the performance of one or more predetermined actions that involve data decoded from such a confirmed encoded data marking.

As previously discussed, in differing embodiments, at least the control routine 340 may be executed by either the processor(s) 150 of the one or more scanning devices 100, or the processor 550 of the control device 500. However, it should be noted that, despite the specific depictions herein of these two particular possibilities for the allocation of performance of functions among multiple processors, still other embodiments with still other allocations of functions among one or more processors are possible, including embodiments in which the processor 150 of at least one scanning device 100 may execute the executable instructions of all of the control routines 240, 340 and 440.

FIGS. 4A, 4B, 4C, 4D, 4E, 4F, 4G and 4H, together, depict aspects of an example embodiment of identification and decoding of an encoded data marking 775 that is carried on a surface of an object 700. These figures also depict aspects of examples of interpreting movement of the encoded data marking 775 within the FOV 117 of an image sensor 110 of a scanning device 100 to identify and respond to manual input conveyed to the system 1000 through such movement.

As depicted, the FOV 117 may be defined as being divided into multiple zones 885, and particular instances of movement of an encoded data marking 775 between adjacent ones of the zones 885 may be interpreted as instances of the provision of manual input by personnel handling the object 700. As will be explained in greater detail, some predetermined types of movement of an encoded data marking 775 into the FOV 117 and/or among the zones 885 may trigger the visual presentation of one or more visual guides 775 that may be associated with one or more of the zones 885, and may serve to guide personnel handling the object 700 in moving the object 700 in a manner that causes the encoded data marking 775 to be moved into one or more particular zones 885, and the occurrence of such movement may then be interpreted as the provision of manual input.

As also depicted, in some embodiments, an encoded data marking 775 carried by an object 700 may be accompanied by an anchor marking 772 that is also carried by that object 700. As those skilled in the art will readily recognize, some encoded data markings 775, such as two-dimensional (2D) barcodes (e.g., QR codes) may incorporate a relatively large number of visual features (e.g., edges, shapes, etc.) within a relatively small 2D space that may require considerable processing resources to directly locate on a surface. In an effort to avoid such a high processing resource requirement for the act of locating such a complex encoded data marking 775, such a complex encoded data marking 775 may be accompanied by an anchor marking 772 that is of a deliberately simpler configuration such that it can be found more easily using considerably less in the way of processing resources. Such an anchor marking 772 is typically placed at a predictable location relative to its corresponding encoded data marking 775. In this way, the locating of an anchor marking 772 serves to provide an indication that 1) there is a corresponding encoded data marking 775 that is also carried by the object 700 on which the anchor marking 772 has been found, and 2) that the corresponding encoded data marking 775 is present within an ROI 777 that is at a predictable location on the object 700 relative to the anchor marking 772.

It should be noted that, despite the depiction of the object 700 of this example as having a box-like shape as would be expected of a box or other form of package, the object 700 may be any of a wide variety of types of object, including a type of object that is not of such a simple geometric shape as the depicted box-like object 700. More specifically, it may be that the object is a complexly configured component of machinery or other irregularly shaped object that provides at least one surface on which the encoded data marking 775 and/or the anchor marking 772 may be carried in any of a variety of ways, including being printed thereon and/or affixed thereto with a sticker onto which one or both of theses markings have been printed.

Figure 4A:
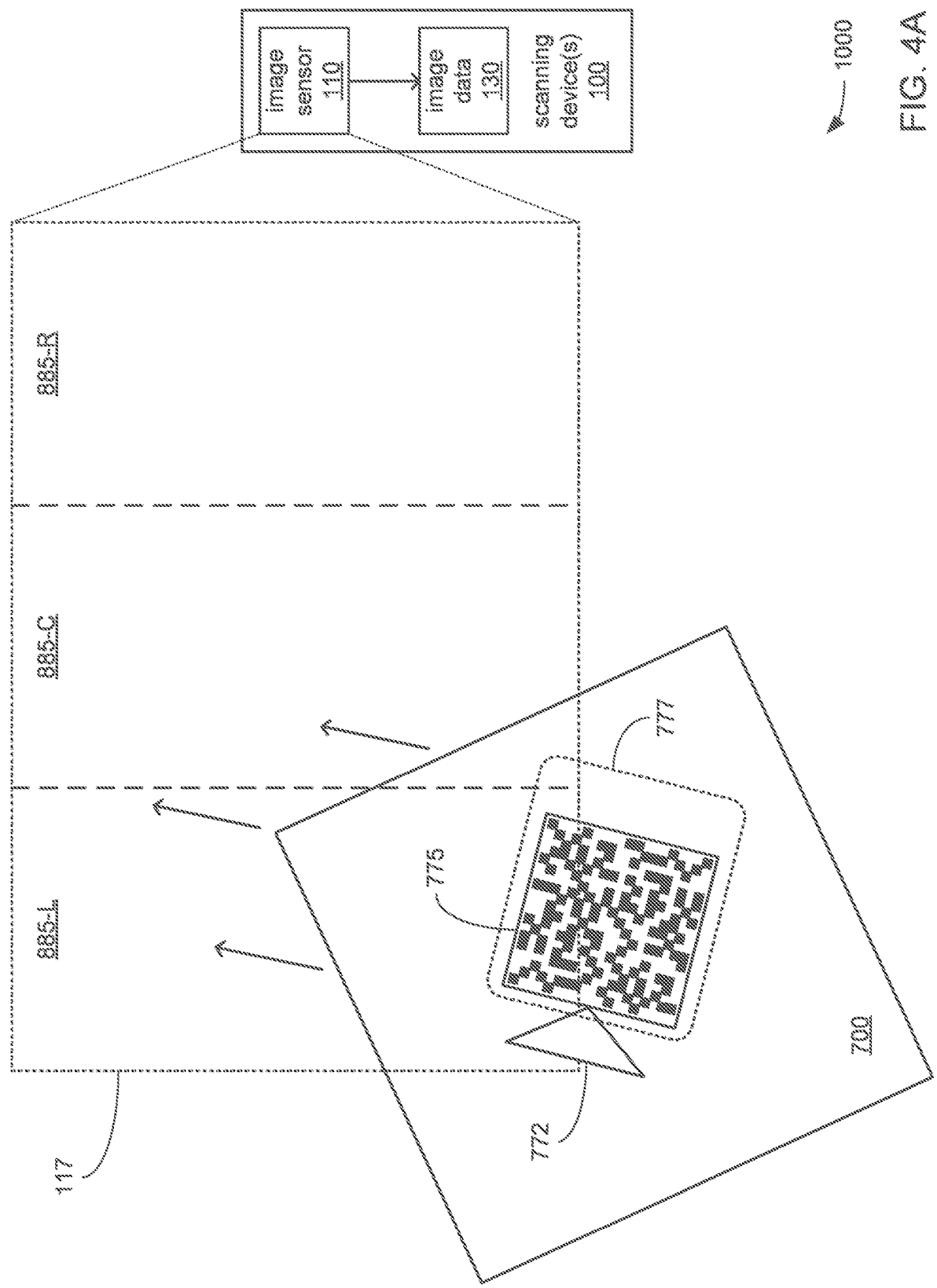

Turning to FIG. 4A, an object 700 is depicted as in the process of being moved into the FOV 117 of the image sensor 110 of the scanning device 100 in the general direction indicated by the depicted triplet of arrows. More specifically, the an encoded data marking 775 carried on the object 700 is depicted as in the process of being moved into leftmost zone 885-L defined within the FOV 117, along with a central zone 885-C and a rightmost zone 885-R. It may be that a person who is handling the object 700 is in the process of moving the object 700 into the FOV 117 for the purpose of causing the encoded data marking 775 to be scanned using the scanning device 100. However, as also depicted, such movement of the object 700 has not yet proceeded far enough as to cause the entirety of the encoded data marking 775, or the entirety of the anchor marking 772 that may accompany the encoded data marking 775 (again, the encoded data marking 775 may or may not be accompanied by the anchor marking 772), to enter into the FOV 117. Therefore, although the image sensor 110 may be operated to recurringly capture images of whatever may happen to fall within the FOV 117, the fact that neither the anchor marking 772 (if present) or the encoded data marking 775 has yet fully entered into the FOV 117 may result in neither marking yet being identifiable by the decoding system 1000.

Figure 4B:
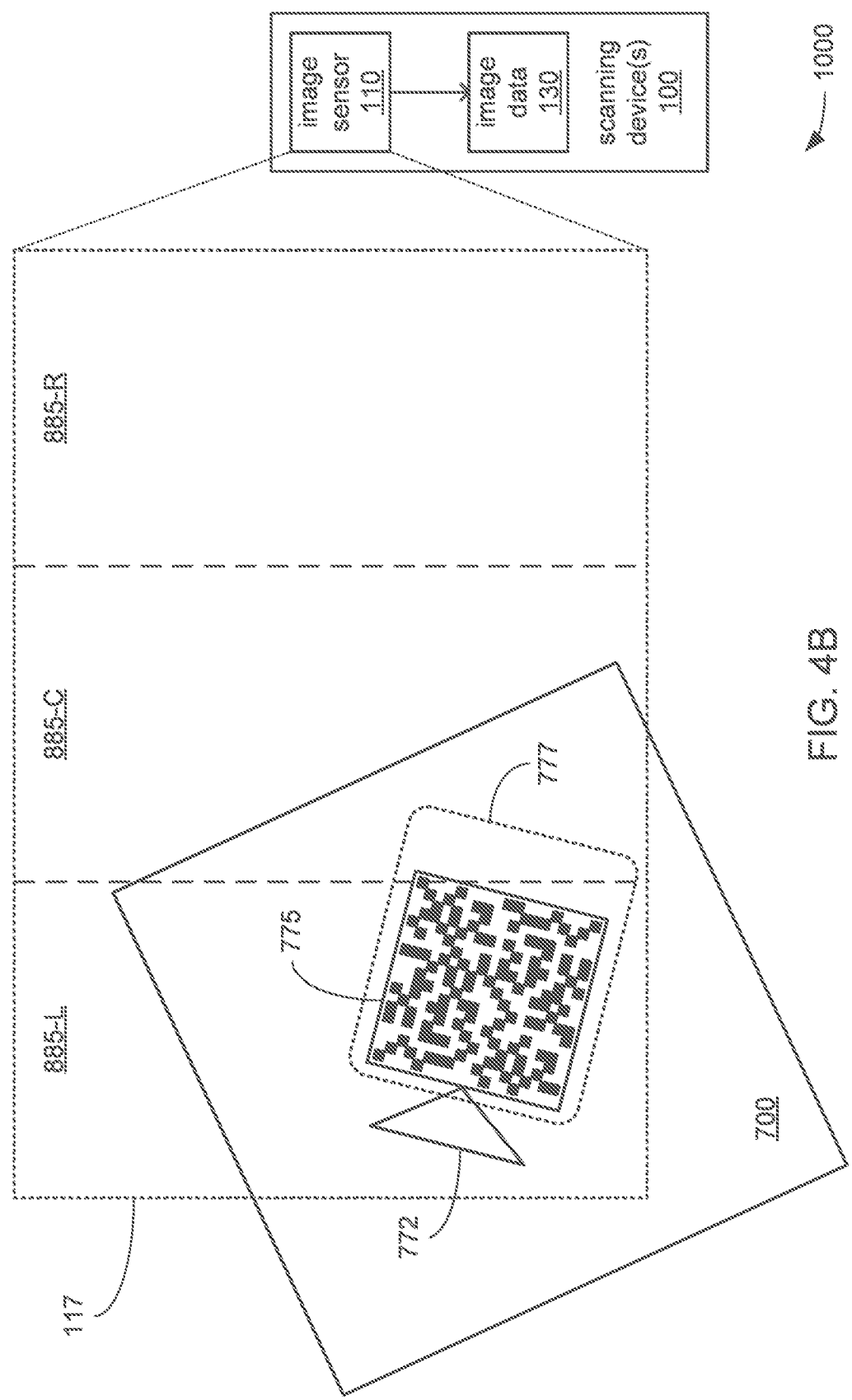
Figure 4D:
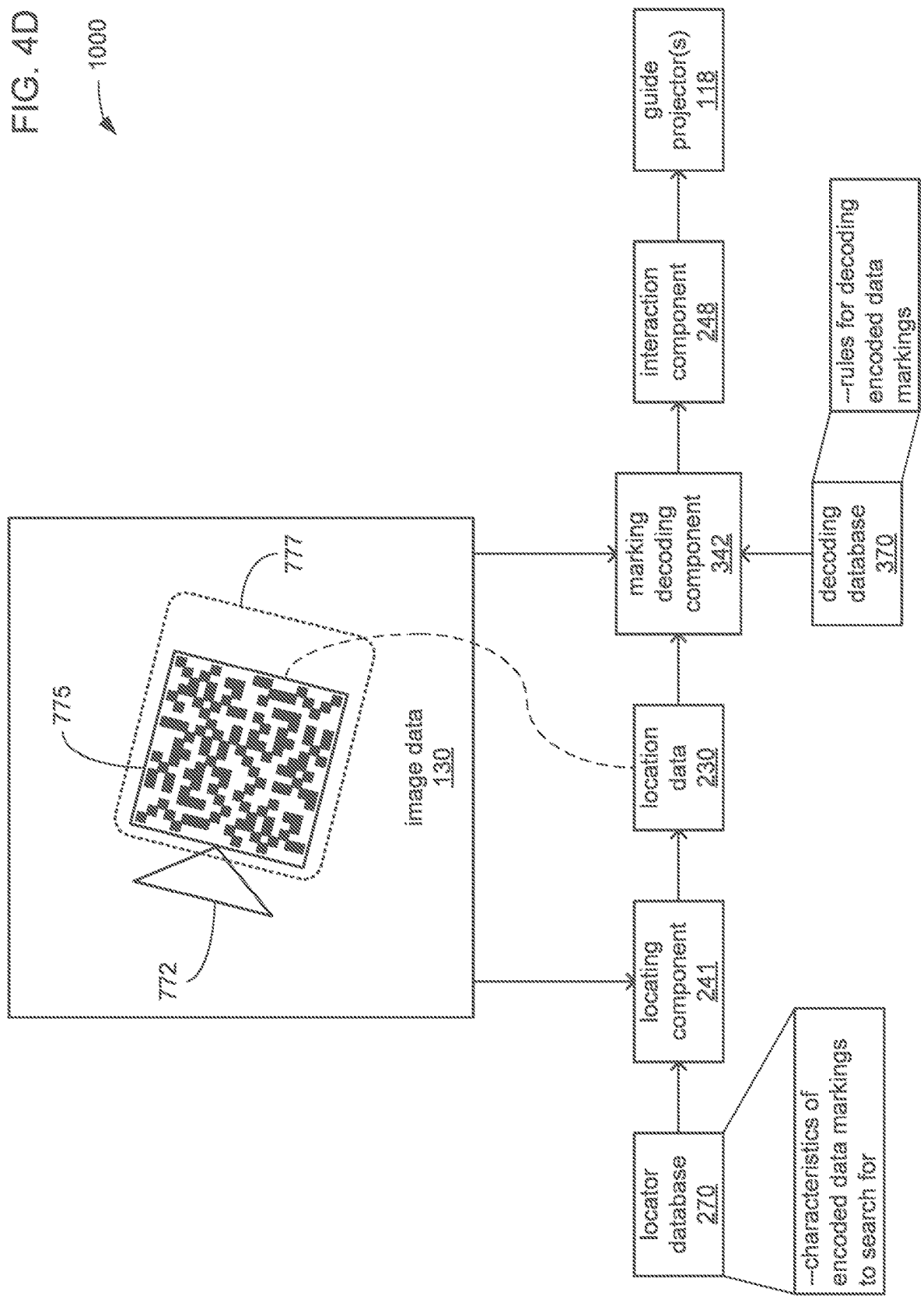

Turning to FIG. 4B, the object 700 has now been moved into the FOV 117 far enough to cause the entirety of the encoded data marking 775 and the entirety of the anchor marking 772 (if present) to now fall within the FOV 117. More specifically, much of the encoded data marking 775 now falls within the leftmost zone 885-L. As a result of the entry of one or both of these markings 772 and 775 into the FOV, one or both of these markings 772 and 775 may now be detected in images captured by the scanning device 100. FIGS. 4C and 4D depict aspects of two different approaches to detecting the encoded data marking 775.

Turning to FIG. 4C, where the encoded data marking 775 is accompanied by the anchor marking 772, in executing the control routine 240, the processor 150 within the scanning device 100 may detect the presence of the encoded data marking 775 within one or more of the images captured by the scanning device 100 through use of its corresponding anchor marking 772. More specifically, in executing the locating component 241, the processor 150 may be caused to retrieve indications of what anchor markings 772 to search for within each captured image from the locator database 270. In some embodiments, the locator database 270 may include a separate entry for each anchor marking 772 that may be searched for, and each such entry may provide some indication of one or more characteristics of a particular anchor marking 772 to be used in performing such searches. Each such entry may also include an indication of the location of a corresponding ROI 777 relative to the anchor marking 772.

In response to having successfully detected the anchor marking 772 within an image captured by the scanning device 100 (and stored as part of the image data 130), the processor 150 may then be caused to determine the location of the corresponding ROI 777 within the captured image (and therefore, within the FOV 117) relative to the anchor marking 772, and may store an indication of that location within the location data 230 as a possible location at which the corresponding encoded data marking 775 may be found. Also in response to having successfully detected the anchor marking 772, the processor 150 may be caused by the interaction component 248 to operate at least one of the one or more guide projectors 118 to project at least one visual guide 785 onto the object 700 to guide further movement of the object 700 to cause the encoded data marking 775 to be moved to a starting point defined within the FOV 117, as will shortly be explained in greater detail.

Turning to FIG. 4D, where the encoded data marking 775 is not accompanied by the anchor marking 772, as an alternative to what has just been described in connection with FIG. 4C, the processor 150 may be caused by the locating component 241 in FIG. 4D to retrieve indications of characteristics of the encoded data marking 775 from the locator database 270 to enable the processor 150 to directly search for encoded data markings 775 within captured images, instead of searching for their corresponding anchor markings 772. In some embodiments, the locator database 270 may include a separate entry for each type of encoded data marking 775 that may be searched for, and each such entry may provide some indication of one or more characteristics of a particular type of encoded data marking 775 to be used in performing such searches. In response to having successfully detected what may be the encoded data marking 775 within an image captured by the scanning device 100 (and stored as part of the image data 130), the processor 150 may then be caused to store an indication of its location within the location data 230.

The processor 150 may also be caused by the marking decoding component 342 to retrieve indications of rules for the decoding of data that is encoded within one or more types of encoded data marking 775 from the decoding database 370. In some embodiments, the decoding database 370 may include a separate entry for each type of encoded data marking 775 that may be decoded, and each such entry may provide some indication of one or more specific algorithms to employ in interpreting visual features to decode encoded data. If the processor 150 is able to successfully decode the data encoded within the encoded data marking 775, then this may be presumed to be confirmation that an encoded data marking 775 has been found. In response to having confirmed the detection of the encoded data marking 775, the processor 150 may be caused by the interaction component 248 to operate at least one of the one or more guide projectors 118 to project at least one visual guide 785 onto the object 700 to guide further movement of the object 700 to cause the encoded data marking 775 to be moved to a starting point defined within the FOV 117, as will shortly be explained in greater detail.

Thus, a substantial difference between the triggering of the projection of one or more visual guides 785 as described in connection with FIG. 4C versus such triggering as described in connection with FIG. 4D, is that the such triggering described in connection with FIG. 4D requires confirmation that the encoded data marking 775 has been found. In contrast, such triggering described in connection with FIG. 4C requires just the detection of an anchor marking 772 that is presumed to correspond to an ROI 777 within which the encoded data marking 775 is presumed to be present.

Figure 4E:
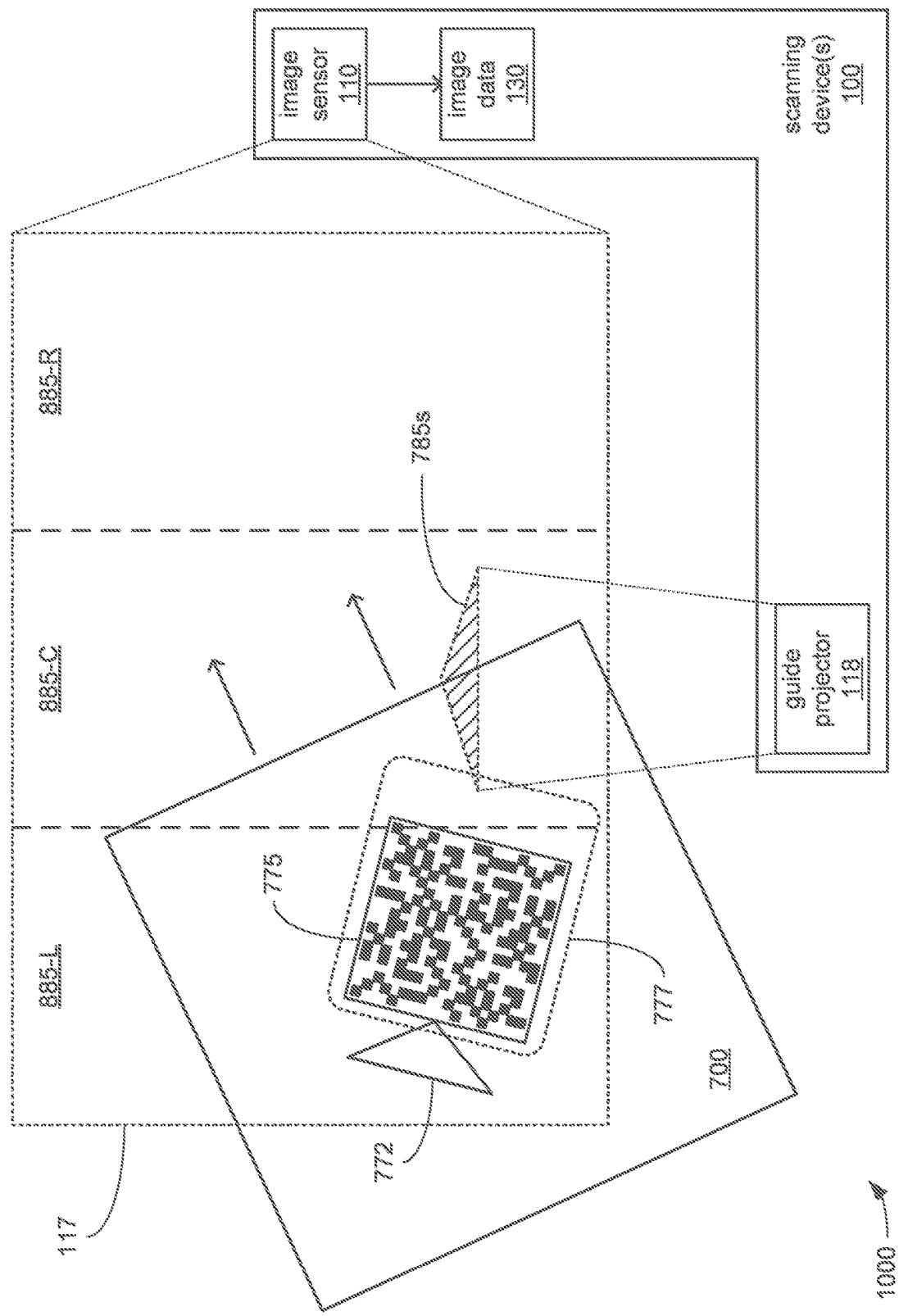

FIG. 4E depicts aspects of the projection of a single visual guide 785s that may have been triggered as described in connection with either of FIG. 4C or 4D to provide guidance to a person concerning how to move the object 700 (e.g., in the general direction indicated by the depicted pair of arrows) to cause the encoded data marking 775 to be moved toward a starting location that is indicated by the arrow head-like shape of the depicted embodiment of the visual guide 785s as being within the central zone 885-C within the FOV 117. It should be noted that such projection of just the single visual guide 785s that serves to indicate such a starting location is but one possible response to the successful detection of either the encoded data marking 775 or the anchor marking 772. In other embodiments, a set of multiple visual guides 785 that serve to indicate more than just the starting location may be triggered to be projected. Also, it should be noted that, despite the specific depiction of a visual guide 785s having a particular arrow head-like shape and size relative to the encoded data marking 775, other embodiments are possible in which each of the visual guides 785 that may be projected may be of any of a wide variety of shapes, sizes, colors, levels of brightness of projection, etc.

Regardless of what exact one or more visual guides 785 are caused to be projected, as depicted in FIG. 4E, such projection of one or more visual guides 785 (e.g., the depicted single visual guide 785*s*) may also serve to provide the person handling the object 700 with visual confirmation that the encoded data marking 775 (or at least its corresponding anchor marking 772) has been successfully detected by the decoding system 1000. However, in some embodiments, one or more other approaches may be used to provide such confirmation. By way of example, the scanning device 100 may additionally incorporate a speaker, buzzer or other form of audible annunciation device (not shown) that may provide a beep sound or other audible indication that serves to provide such confirmation. Such an audible indication may be caused to sound concurrently with the commencement of projection of the visual guide 785*s*.

Figure 4F:
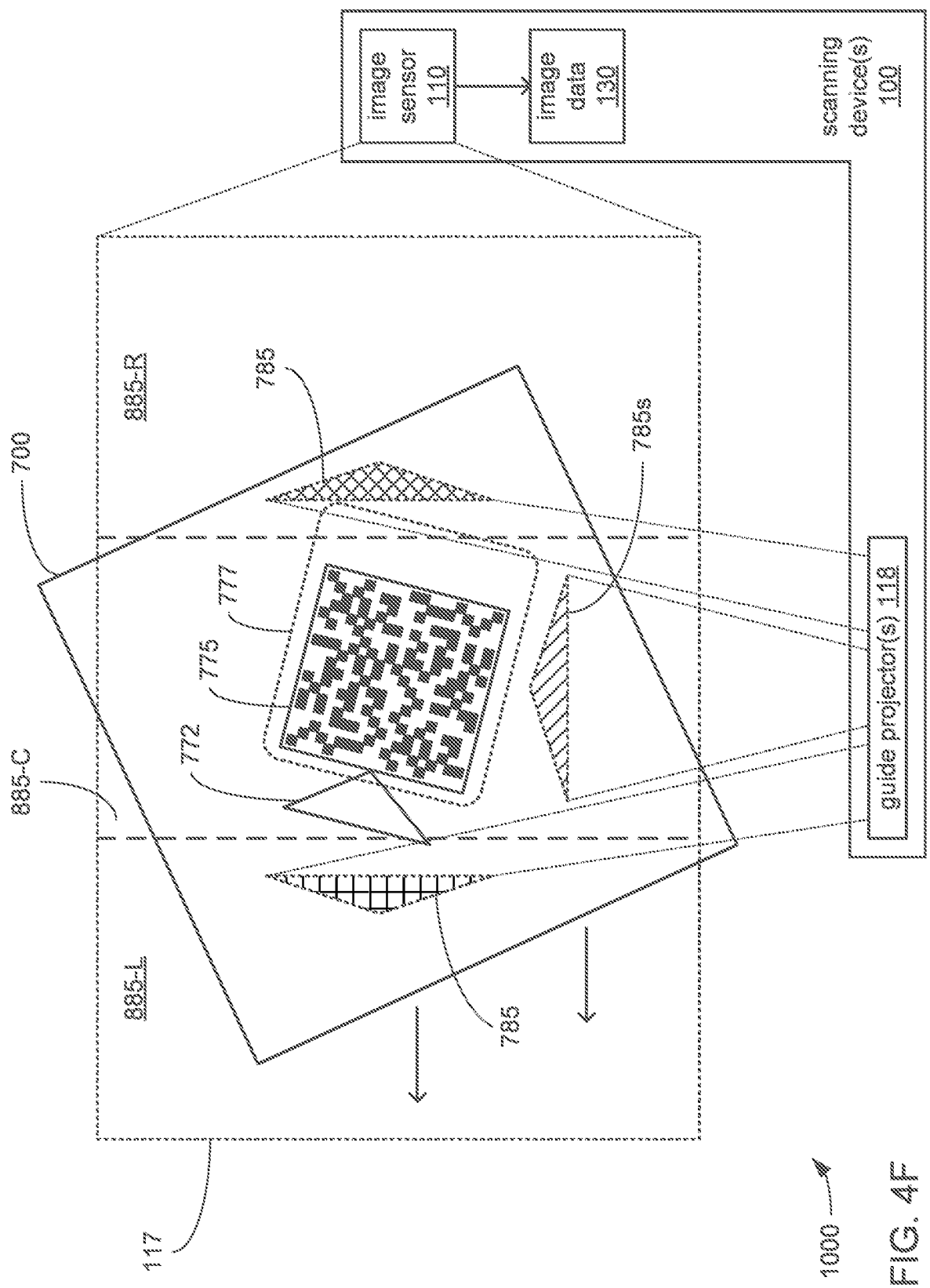

Turning to FIG. 4F, with the object 700 having been moved to cause movement of the encoded data marking 775 to the starting point within the central zone 885-C indicated by the visual guide 785*s*, the processor 150 of the scanning device 100 may provide a visual acknowledgement of having detected the encoded data marking 775 as having been so moved to the starting point. Alternatively, in embodiments in which the encoded data marking 775 is accompanied by an anchor marking 772, it may be that the processor 150 is caused to track the position of the ROI 777 (based on the relative of the anchor marking 772), rather than to directly track the position of the encoded data marking 775, and it may be that the processor 150 is caused to provide a visual acknowledgement of having detected the ROI 777 as having been moved to the starting point as a proxy detecting movement of the encoded data marking 775 (which is expected to be present within the ROI 777) to the starting point.

Regardless of the exact manner in which the movement of the encoded data marking 775 to the starting point is monitored for and detected, the visual acknowledgement provided in response may be the commencement of projection of one or more additional visual guides 785 that provide indications of one or more other locations to which the encoded data marking 775 may next be moved by the person handling the object 700 to thereby cause manual entry of input to the decoding system 1000. More specifically, the two additional visual guides 785 depicted as being projected in FIG. 4F may serve to guide movement of the encoded data marking 775 either to a location within the leftmost zone 885-L to effect manual entry of one manual input, or to a location within the rightmost zone 885-R to effect manual entry of a different manual input.

The provision of such an acknowledgement may serve as an indication to the person handling the object 700 that, since movement of the encoded data marking 775 has been successfully made, the person handling the object 700 may now select one of the other locations to which to cause the encoded data marking 775 to move to effect such manual entry of a selected input. Stated differently, it may be that acceptance of manual input through movement of the encoded data marking 775 within the FOV 117 is conditioned on the encoded data marking 775 having first been moved to the starting point within the central zone 885-C.

As depicted, the two additional visual guides 785 that are caused to be projected as such an acknowledgement may each have a similar shape and size to the visual guide 785*s* associated with the starting point. In some embodiments, there may be differences in the visual guides 785 and/or 785*s* that are projected as part of providing an indication of what manual input is associated with the location that corresponds to each. By way of example, and as depicted using different patterns in FIG. 4F, each of the depicted visual guides 785 and 785*s* may be of a different color. In other embodiments, different shapes and/or sizes may be used. In still other embodiments, one or more of the visual guides 785 may incorporate (or be otherwise accompanied by) text describing the manual input associated with each.

The requirement that the encoded data marking 775 first be caused to be moved into a starting point within one zone 885 before further movement to another location within another zone 885 could be recognized as the provision of manual input may be used as an approach to prevent instances of "false positives" of entry of manual input. More specifically, it may be that entry of the encoded data marking 775 into the FOV 117 may be from almost any part of the edge of the FOV 117. It may therefore be deemed undesirable to rely on a simple movement of the encoded data marking 775 across the FOV in a particular direction as providing manual input without first requiring a distinct stop at a distinct location within a particular zone 885, since such a simple movement may all too easily occur by happenstance as a result of the encoded data marking 775 simply being brought into the FOV 117 by a person moving the object 700 into the FOV 117. Further, requiring that the encoded data marking 775 first be moved into a starting point located generally at the center of the FOV 117 (e.g., within the central zone 885-C), as depicted, makes use of a widely observed tendency that many people already have to move an encoded data marking into the center of an FOV in preparation for scanning it.

Figure 4G:
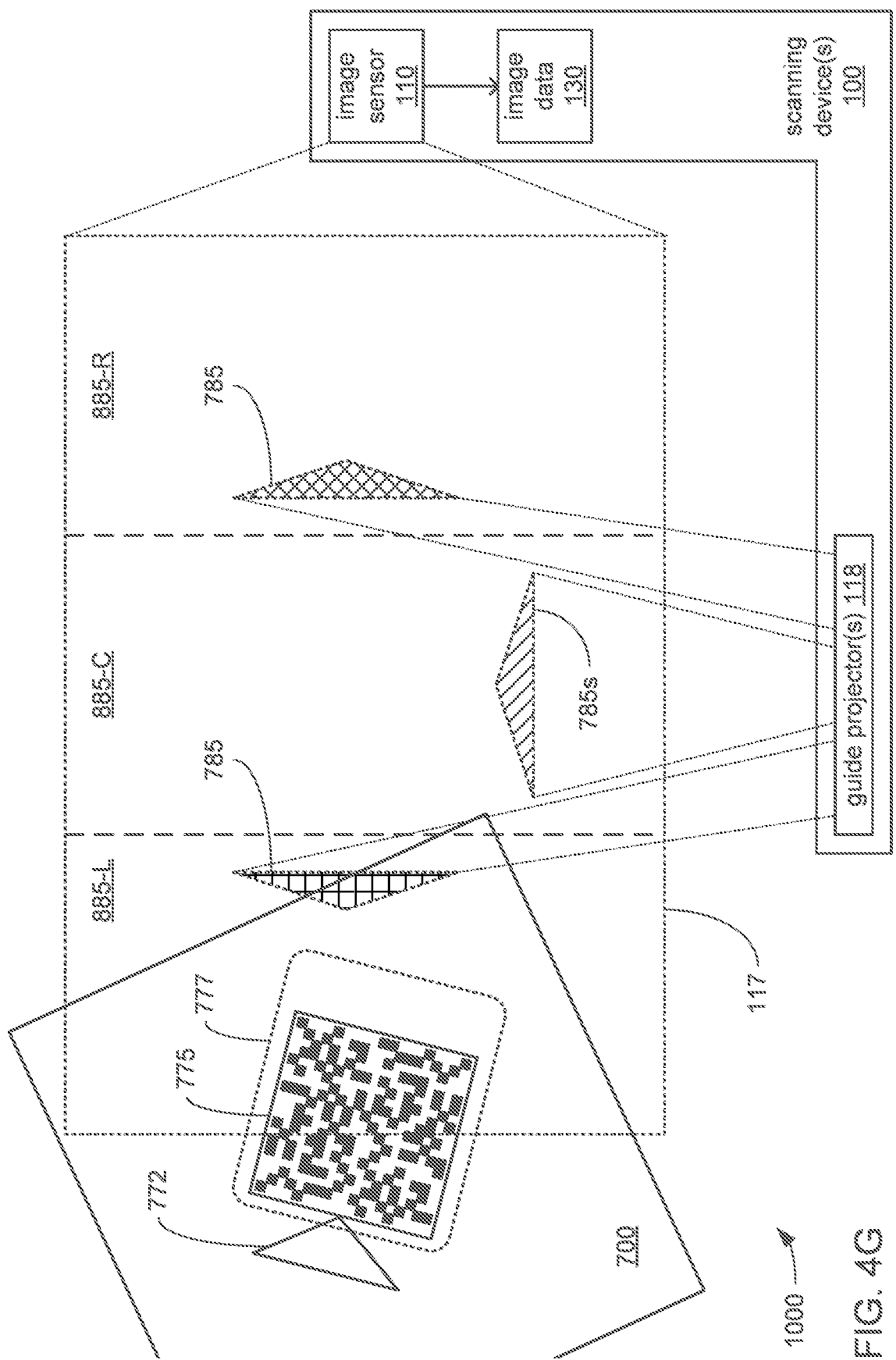

Turning to FIG. 4G, the person handling the object 700 may have chosen to move the object 700 in the general direction of the pair of arrows depicted in FIG. 4F to cause the encoded data marking 775 to be moved from the starting location, and into and through the location indicated by one of the visual guides 785 as being located within the leftmost zone 885-L to cause the manual entry of the particular input associated with that location. By providing a way for the person handling the object 700 to provide manual input by simply moving the object 700, that person is not required to take either their gaze or their hands off of the object 700 to take an action to provide that manual input. Thus, that person is allowed to maintain their focus on the object 700, and after having so moved the object 700 to provide manual input, that person is able to move the object 700 to a location outside of the FOV 117 without having ever let go of the object 700. Over time, with some practice, a person could begin to turn the combination of moving encoded data markers 775 of objects 700 into the FOV 117 and into one particular zone 885, followed by further movement into another particular zone 885 to provide manual input, and then still more movement out of the FOV 117, into a single fluid and efficient motion that requires minimal time and effort.

Figure 4H:
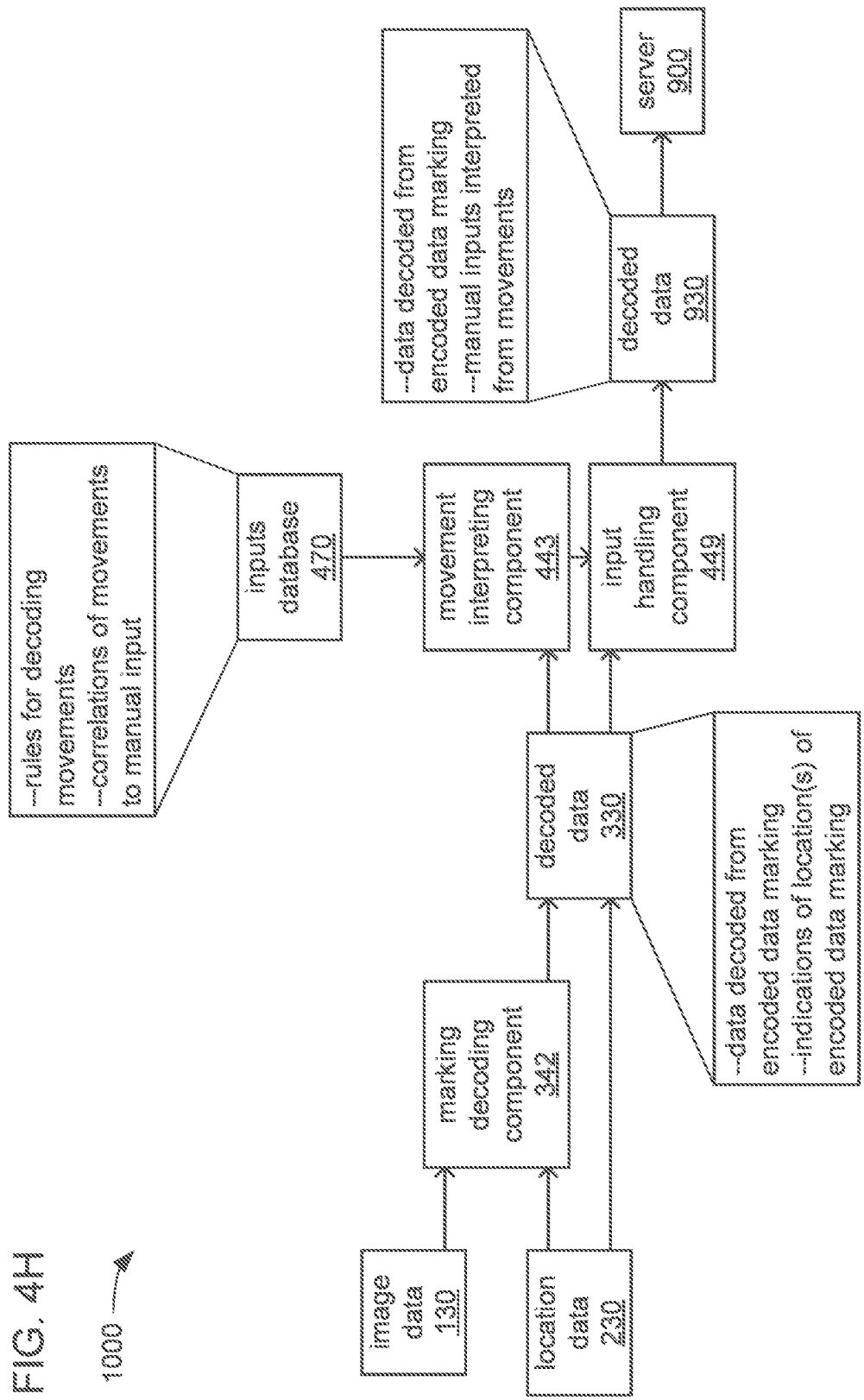

Turning to FIG. 4H, as depicted, in some embodiments, the decoded data 330 may include indications from the location data 230 of changes in location of the encoded data marking 775 over time through multiple captured images. The processor 550 of the control device 500 may be caused by the movement interpreting component 443 to analyze those changing location indications over time to determine whether there is an indication of a movement or combination of movements that convey manual input. In preparation, the processor 550 may be caused to retrieve indications of rules for interpreting movement and/or indications of correlations of specific movements (or specific combinations of movement) to specific manual inputs from the inputs database 470.

In some embodiments, one or more of the possible manual inputs that may be received by the decoding system 1000 may indicate a manner in which the data decoded from the encoded data marking 775 is to be manipulated (e.g., put through one or more mathematical, logical, or other operations) before being provided to another device (e.g., one of the one or more servers 900) via the network 999. Alternatively or additionally, one or more of the possible manual inputs that may be received may simply provide additional data that is to accompany the data decoded from the encoded data marking 775 in being provided to another device. As still another alternative, one or more of the possible manual inputs may specify which other device (e.g., which server 900) is to be provided with the data decoded from the encoded data marking 775.

By way of another more specific example, it may be that different manual inputs that may be provided through movement of the encoded data marking 775 toward different other locations within the FOV 117 from a starting point may be used to indicate an intended disposition of an object 700. More specifically, a movement toward one location within the FOV 117 from a starting point may indicate that the corresponding object 700 is to be stored, while a movement toward another location may indicate that the corresponding object 700 is to be discarded. The encoded data marking 775 carried by each object 700 may encode a unique identifier given to each object 700, and the decoding system 1000 may convey indications to the one or more servers 900 of which objects 700 (as identified by those unique identifiers) are indicated as ones to be stored and which are indicated as ones to be discarded. Depending on which category each object 700 is assigned to, its unique identifier may be transmitted to either a server 900 storing indications of which objects 700 are to be stored, or another server 900 storing indications of which objects 700 are to be discarded.

By way of another more specific example, it may be that different manual inputs that may be provided through movement of the encoded data marking 775 toward different other locations within the FOV 117 from a starting point may be used to indicate the formation of groups of objects 700 that are meant to be associated with each other. More specifically, a movement toward one location within the FOV 117 from a starting point may indicate that the corresponding object 700 is the first object in a new group of objects that is now to be defined, and which may include one or more further objects that have as yet to be scanned, while a movement toward another location may indicate that the corresponding object 700 is the last object in a group, and that there will be no more objects 700 added to that group. In this way, objects 700 may be grouped for storage as a set and/or grouped for shipment together within a single shipping package, pallet, container, etc.

FIGS. 5A, 5B, 5C and 5D depict aspects of different additional examples of the defining of locations and/or zones 885 within an FOV 117, different additional examples of visual guides 785 that may be projected onto portions of an object 700 within an FOV 117, and different examples of interpretation of movements of an encoded data marking 775 among locations and/or zones 885 within an FOV 117.

Figure 5A:
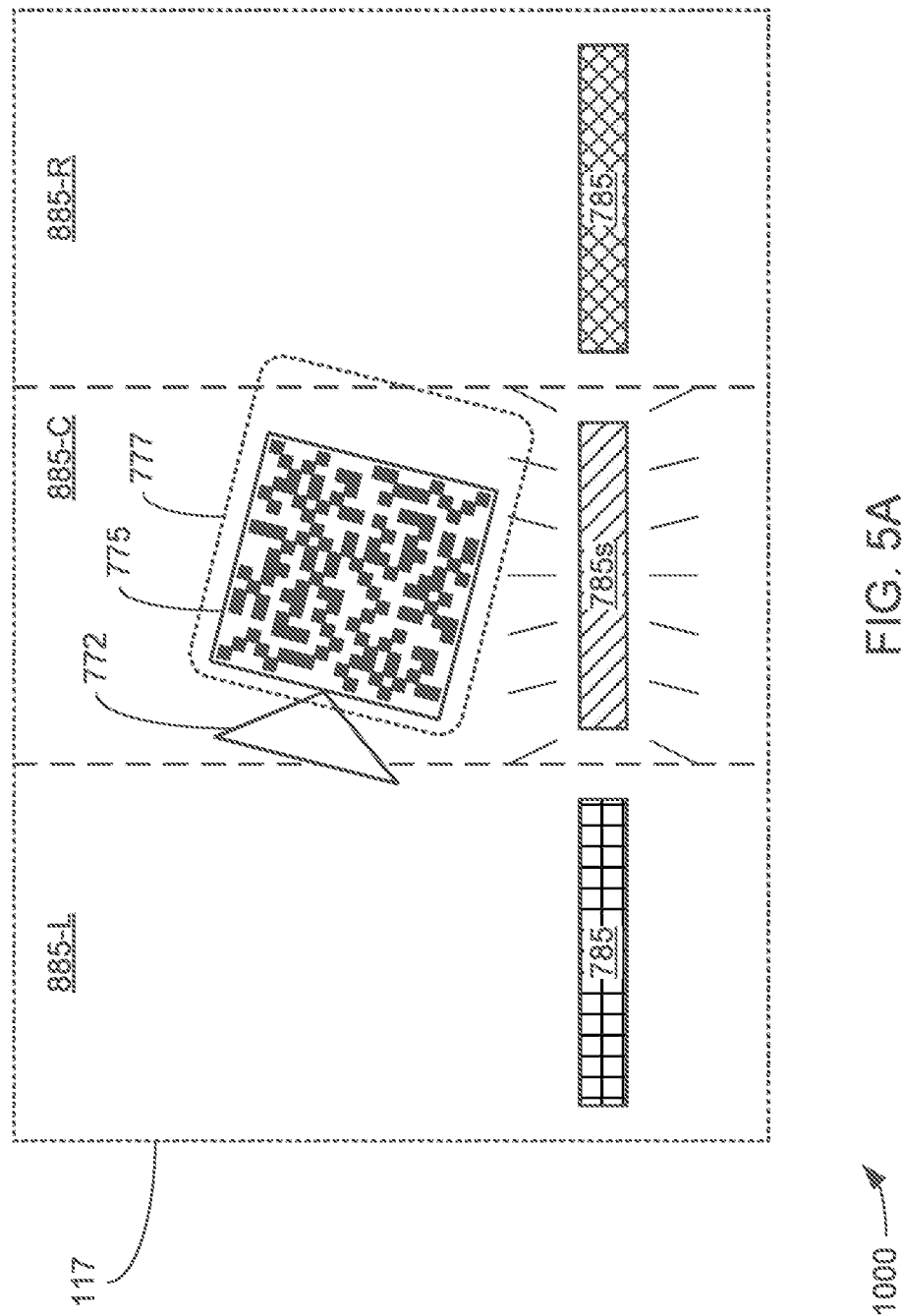
FIGS. 5A, 5B, 5C and 5D show aspects of alternate example embodiments of locations and/or zones among which an encoded data marking may be moved within an FOV, alternate example embodiments of projected visual guides, and alternate examples embodiments of defining movements of an encoded data marking within an FOV.

Turning to FIG. 5A, in response to the detection of the movement of the encoded data marking 775 into the FOV 117, it may be that all of the visual guides 785 are projected together, rather than just the visual guide 785s associated with a starting point, as depicted in FIG. 4E. In this way, a person handling the object 700 is still given guidance for moving the object 700 to cause movement of the encoded data marking 775 to the starting point within the central zone 885-C, but that guidance is accompanied by indications of the other locations within each of the leftmost zone 885-L and the rightmost zone 885-Z to which the encoded data marking 775 may be subsequently moved to provide manual input. As depicted, it may be that the person handling the object 700 is given visual confirmation of having successfully moved the encoded data marking 775 to the starting point within the central zone 885-C by a change in the appearance and/or visual presentation of the visual guide 785s, including and not limited to, a change in brightness, flashing, a change in color, a change in size relative to the other visual guides 785, etc.

Figure 5B:
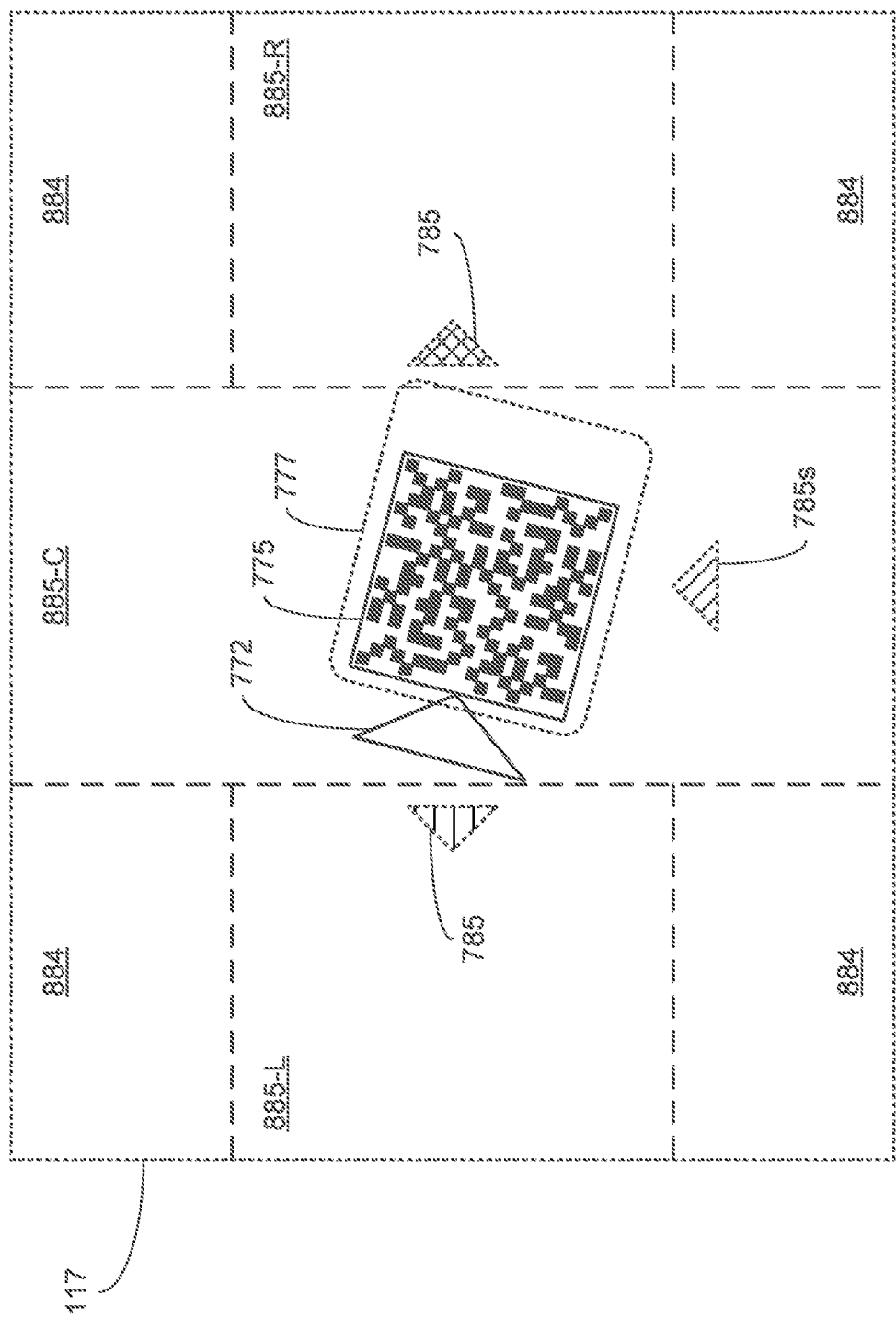
Figure 5C:
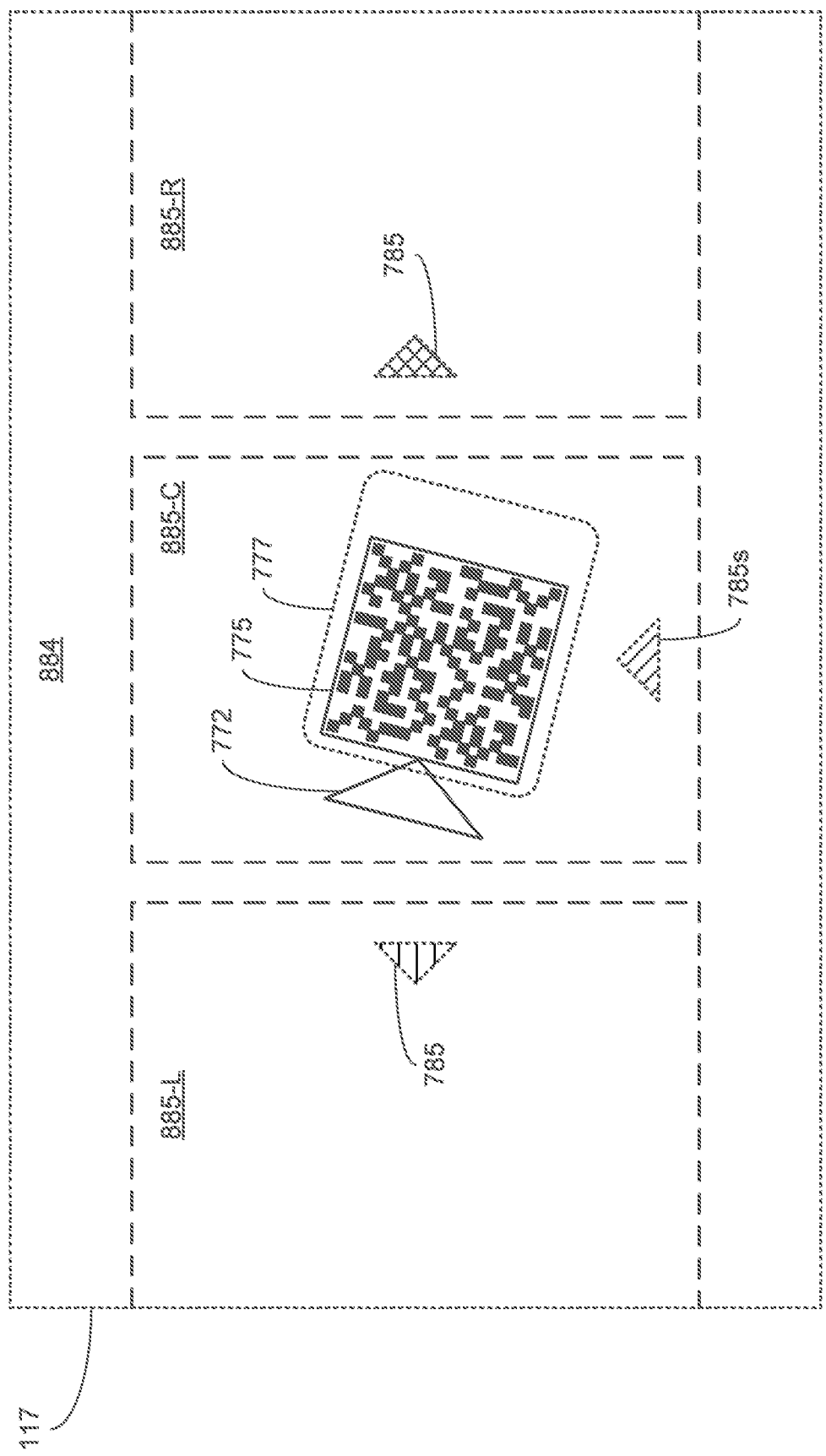

Turning to FIGS. 5B and 5C, where the FOV 117 is sufficiently large, it may be that one or more of the zones 885 defined within the FOV 117 may be bordered, surrounded and/or separated by one or more inactive regions 884 in which movement of the encoded data marking 775 therein and/or therethrough is not interpreted as providing manual input. It may be deemed advantageous to provide one or more of such inactive regions 884 around and/or between zones 885 as another mechanism to prevent "false positives" in the interpretation of movement of the encoded data marking 775 within the FOV 117. More precisely, surrounding a zone 885 with an inactive region 774 and/or separating two or more zones 885 with inactive region(s) 774 may serve to impose a requirement that a person handling an object 700 within the FOV 117 must move the object 700 in a more deliberate manner to cause the encoded data marking 775 to be moved fully from one zone 885 to another.

Figure 5D:
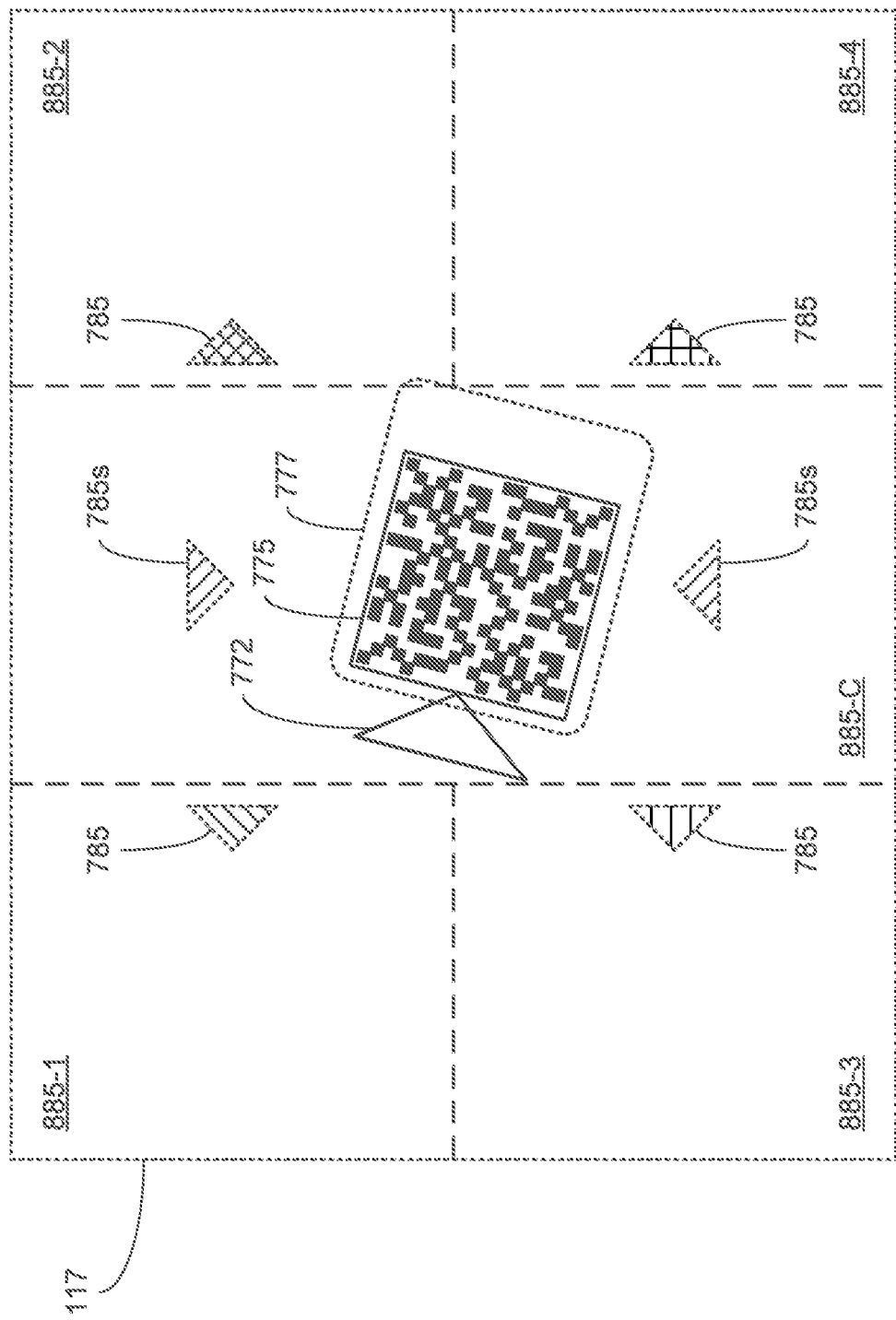

Turning to FIG. 5D, where the FOV 117 is sufficiently large, it may be that there is a greater number of zone 885 (e.g., the depicted central zone 885-C, and a four corner zones 885-1, 885-2, 885-3 and 885-4 defined within the four corners of the rectangular-shaped of the FOV 117) such that there are more other locations to which the encoded data marking 775 may be subsequently moved than the two other locations within the leftmost zone 885-L and the rightmost zone 885-R depicted in FIGS. 4F and 4G. More specifically, as depicted in FIG. 5B, there may be one of such other locations positioned within each of the four corners of the rectangular-shaped FOV 117, with each indicated by a separate visual guide 785. Again, each such visual guide 785 (except for the depicted pair of visual guides 785s) may be given a different color and/or other differing visual characteristics.

There is thus disclosed a system to capture and decode encoded data. The features set forth below may be combined in any of a variety of ways to create any of a variety of embodiments of a decoding device, a decoding system and/or a method of decoding data encoded within encoded data markings.

The provision of such a larger quantity of zones 885 may enable the use of movements of an encoded data marking 775 to provide manual input in more complex user interfaces, including and not limited to, editing of commands previously provided through earlier ones of such movements, and/or making selections within menu systems. By way of example, a movement of an encoded data marking 775 to a location within a particular zone 885 may be interpreted as a manually provided command to "undo" or "delete" a previous command, operation, selection, etc. that was made with an earlier movement of the encoded data marking to a location within another zone 885. By way of another example, a movement of an encoded data marking 775 to a location within one of two particular zones 885 may be interpreted as a manually provided command to either descend deeper into a submenu of items that may be selected or pull back out into a higher level menu from within a submenu. By way of still another example, repeating a movement of an encoded data marking to a location within a particular zone 885 may be interpreted as undoing the manual input that was provided by the original movement of same encoded data marking to that same location.

A devices includes an image sensor configured to capture multiple images of an object present within a field of view (FOV) of the image sensor; storage configured to store image data representing the multiple images; at least one guide projector configured to project a visual guide onto a surface of the object using light; and a processor coupled to the at least the storage and the at least one guide projector. The processor is configured to analyze a first subset of the multiple images to detect entry of an encoded data marking carried by the object into the FOV. In response to the detection of entry of the encoded data marking into the FOV, the processor is further configured to: operate a first guide projector of the at least one guide projector to project a first visual guide onto a surface of the object to guide movement of the object to cause the encoded data marking to be moved to a first location indicated by the first visual guide within the FOV; analyze a second subset of the multiple images to detect movement of the encoded data marking to the first location, and then to a second location within the FOV; and in response to the detection of movement of the encoded data marking to the first location, and then to the second location, the processor is further configured to interpret the movement of the encoded data marking from the first location to the second location as receipt of a first manual input, and in response to the receipt of the first manual input, transmit data decoded from the encoded data marking to a first other device via a network.

The FOV may be divided into multiple zones, including a first zone and a second zone; the first location may be within the first zone; the second location may be within the second zone; the detection of movement of the encoded data marking to the first location may include detection of movement of the encoded data marking into the first zone; and the detection of movement of the encoded data marking from the first location to the second location may include detection of movement of the encoded data marking from within the first zone and into the second zone.

In response to the detection of entry of the encoded data marking into the FOV, the processor may be further configured to operate a second guide projector of the at least one guide projector to project a second visual guide onto the surface of the object to guide movement of the object to cause the movement of the encoded data marking from the first location to the second location. In response to the detection of movement of the encoded data marking to the first location, the processor may be further configured to operate the first guide projector to alter an aspect of the appearance of the first visual guide to provide visual acknowledgement of the encoded data marking successfully reaching the first location, or operate an audio output device of the scanning device to provide audible acknowledgement of the encoded data marking successfully reaching the first location.

The processor may be further configured to, in response to the detection of movement of the encoded data marking to the first location, operate a second guide projector of the at least one guide projector to project a second visual guide onto the surface of the object to provide visual acknowledgement of the encoded data marking successfully reaching the first location, and to guide movement of the object to cause the movement of the encoded data marking from the first location to the second location.

In response to the detection of entry of the encoded data marking into the FOV, the processor may be further configured to: analyze the second subset of the multiple images to detect movement of the encoded data marking to the first location, and then to a third location within the FOV; and in response to the detection of movement of the encoded data marking to the first location, and then to the third location, interpret the movement of the encoded data marking from the first location to the third location as receipt of a second manual input.

The second manual input may be associated with a selection of a second other device to transmit the decoded data to; and the processor may be further configured to, in response the receipt of the second manual input, transmit the decoded data to the second other device via the network.

The first manual input may be associated with a selection of a first operation to perform with the decoded data; the second manual input may be associated with a selection of a second operation to perform with the decoded data; and the processor may be further configured to, prior to transmission of the decoded data to the first other device, perform one of the first operation and the second operation with the decoded data based on the which of the first manual input and the second manual input is received.

A decoding system includes a scanning device, wherein the scanning device includes an image sensor configured to capture multiple images of an object present within a field of view (FOV) of the image sensor, and at least one guide projector configured to project a visual guide onto a surface of an object using light. The scanning device is configured to analyze a first subset of the multiple images to detect entry of an encoded data marking carried by the object into the FOV. In response to the detection of entry of the encoded data marking into the FOV, the scanning device is further configured to: operate a first guide projector of the at least one guide projector to project a first visual guide onto a surface of the object to guide movement of the object to cause the encoded data marking to be moved to a first location indicated by the first visual guide within the FOV; and analyze a second subset of the multiple images to detect movement of the encoded data marking to the first location, and then to a second location within the FOV. The decoding system also includes a control device coupled to the scanning device and comprising a processor. The processor is configured to receive, from the scanning device, an indication of the detection of movement of the encoded data marking to the first location, and then to the second location. In response to the movement of the encoded data marking to the first location, and then to the second location, the processor is further configured to: interpret the movement of the encoded data marking from the first location to the second location as receipt of a first manual input; and in response to the receipt of the first manual input, transmit data decoded from the encoded data marking to a first other device via a network.

To response to the detection of entry of the encoded data marking into the FOV, the scanning device may be further configured to: transmit, to the control device, the indication of the detection of movement of the encoded data marking to the first location, and then to the second location; and transmit, to the control device, at least one image of the multiple images that includes the encoded data marking to the processor. The processor may be further configured to:

receive, from the scanning device, the at least one image; and decode the encoded data marking.

In response to the detection of entry of the encoded data marking into the FOV, the scanning device may be further configured to operate a second guide projector of the at least one guide projector to project a second visual guide onto the surface of the object to guide movement of the object to cause the movement of the encoded data marking from the first location to the second location. In response to the detection of movement of the encoded data marking to the first location, the scanning device may be further configured to operate the first guide projector to alter an aspect of the appearance of the first visual guide to provide visual acknowledgement of the encoded data marking successfully reaching the first location, or operate an audio output device of the scanning device to provide audible acknowledgement of the encoded data marking successfully reaching the first location.

In response to the detection of movement of the encoded data marking to the first location, the scanning device may be further configured to operate a second guide projector of the at least one guide projector to project a second visual guide onto the surface of the object to provide visual acknowledgement of the encoded data marking successfully reaching the first location, and to guide movement of the object to cause the movement of the encoded data marking from the first location to the second location.

In response to the detection of entry of the encoded data marking into the FOV, the scanning device may be further configured to: analyze the second subset of the multiple images to detect movement of the encoded data marking to the first location, and then to a third location within the FOV; and transmit, to the control device, an indication of the detection of movement of the encoded data marking to the first location, and then to the third location. The processor may be further configured to: receive, from the scanning device, the indication of the detection of movement of the encoded data marking to the first location, and then to the third location; and in response to the detection of movement of the encoded data marking to the first location, and then to the third location, interpret the movement of the encoded data marking from the first location to the third location as receipt of a second manual input.

The second manual input may be associated with a selection of a second other device to transmit the decoded data to; and the processor may be further configured to, in response the receipt of the second manual input, transmit the decoded data to the second other device via the network.

The first manual input may be associated with a selection of a first operation to perform with the decoded data; the second manual input may be associated with a selection of a second operation to perform with the decoded data; and the processor may be further configured to, prior to transmission of the decoded data to the first other device, perform one of the first operation and the second operation with the decoded data based on the which of the first manual input and the second manual input is received.

A method includes analyzing a first subset of multiple images captured by an image sensor of a scanning device to detect entry of an encoded data marking carried by an object into a field of view (FOV) of the image sensor. The method also includes, in response to the detection of entry of the encoded data marking into the FOV, performing operations including: to guide movement of the object to cause the encoded data marking to be moved to a first location within the FOV, perform at least one of operating a first guide projector of the scanning device to use light to project a first projected visual guide onto a surface of the object or operating a first light-emitting component of the scanning device to provide a first non-projected visual guide at a position about a periphery of the FOV; and analyzing, by a processor, a second subset of the multiple images to detect movement of the encoded data marking to the first location, and then to a second location within the FOV. The method further includes, in response to the detection of entry of the encoded data marking into the FOV and in response to the detection of movement of the encoded data marking to the first location, and then to the second location, performing operations including: interpreting, by the processor, the movement of the encoded data marking from the first location to the second location as receipt of a first manual input; and in response to the receipt of the first manual input, correlating the first manual input to a first operation, and performing the first operation, wherein the first operation comprises transmitting, from the processor, data decoded from the encoded data marking to a first device via a network.

The detection of the entry of the encoded data marking into the FOV may include analyzing, by the processor, the first subset of the multiple images to detect entry of an anchor marking into the FOV in an image of the first subset. The detection of the entry of the encoded data marking into the FOV may also include, in response to the detection of entry of the anchor marking into the FOV, analyzing, by the processor, a portion of the image that falls within a region of interest (ROI) that corresponds to the anchor marking to determine whether the encoded data marking is present within the ROI, wherein: the ROI is positioned at a predetermined location within the image relative to the anchor marking; and analyzing the portion of the image that falls within the ROI to determine whether the encoded data marking is present within the ROI comprises attempting to decode, by the processor, the data encoded within the encoded data marking.

The method may include, in response to the detection of entry of the encoded data marking into the FOV, and to guide movement of the object to cause the movement of the encoded data marking from the first location to the second location, performing at least one of operating a second guide projector of the scanning device to use light to project a second projected visual guide onto the surface of the object or operating a second light-emitting component of the scanning device to provide a second non-projected visual guide at a position about a periphery of the FOV. The method may include, in response to the detection of movement of the encoded data marking to the first location, performing at least one of operating the first guide projector to alter an aspect of the appearance of the first projected visual guide to provide visual acknowledgement of the encoded data marking successfully reaching the first location, operating the first light-emitting component to alter an aspect of the appearance of the first non-projected visual guide to provide visual acknowledgement of the encoded data marking successfully reaching the first location, or operating an audio output device of the scanning device to provide audible acknowledgement of the encoded data marking successfully reaching the first location.

The method may include, in response to the detection of movement of the encoded data marking to the first location, and to guide movement of the object to cause the movement of the encoded data marking from the first location to the second location, performing at least one of operating a second guide projector of the scanning device to use light to project a second projected visual guide onto the surface of the object to provide visual acknowledgement of the encoded data marking successfully reaching the first location, or operating a second light-emitting component of the scanning device to provide a second non-projected visual guide at a position about a periphery of the FOV to provide visual acknowledgement of the encoded data marking successfully reaching the first location.

The method may include, in response to the detection of entry of the encoded data marking into the FOV, performing operations including: analyzing, by the processor, the second subset of the multiple images to detect movement of the encoded data marking to the first location, and then to a third location within the FOV; and in response to the detection of movement of the encoded data marking to the first location, and then to the third location, performing operations including interpreting, by the processor, the movement of the encoded data marking from the first location to the third location as receipt of a second manual input, and in response to the receipt of the second manual input, correlating the second manual input to a second operation.

The second manual input may be associated with a selection of a second device to transmit the decoded data to; and the method may include, in response the receipt of the second manual input, performing the second operation, wherein the second operation comprises transmitting, from the processor, the decoded data to the second device via the network.

The invention claimed is:

1. A wearable scanning device, comprising:
an image sensor configured to capture images of an object present within a field of view (FOV) of the image sensor;
storage configured to store image data representing the images;
a projector configured to project a visual guide for assisting scanning of the object; and
a processor operably coupled to the storage and guide projector, the processor configured to:
operate the projector to project a visual guide to guide movement of the object to cause the encoded data marking to be moved within the FOV;
analyze a subset of the images to detect movement of the encoded data marking to a location within the FOV; and
interpret the movement of the encoded data marking to the location as receipt of a first input and initiate a predetermined operation associated with the interpreted first input in response thereto, wherein the predetermined operation includes specifying a predetermined remote device for communicating data from decoding the encoded data marking.

2. The wearable scanning device of claim 1, wherein the predetermined operation includes specifying a manner in which data from decoding the encoded data marking is manipulated before being communicated to the remote device.

3. The wearable scanning device of claim 1, wherein the predetermined operation includes providing additional data that is to accompany data resulting from decoding the encoded data marking when being communicated to the remote device.

4. The wearable scanning device of claim 1, wherein the visual guide is a light projected onto the object.

5. The wearable scanning device of claim 1, wherein the visual guide is an augmented reality projection.

6. A wearable scanning device comprising:
an image sensor configured to capture images of an object present within a field of view (FOV) of the image sensor;
storage configured to store image data representing the images;
a projector configured to project a visual guide for assisting scanning of the object; and
a processor operably coupled to the storage and guide projector, the processor configured to:
operate the projector to project a visual guide to guide movement of the object to cause the encoded data marking to be moved within the FOV;
analyze a subset of the images to detect movement of the encoded data marking to a location within the FOV; and
interpret the movement of the encoded data marking to the location as receipt of a first input and initiate a predetermined operation associated with the interpreted first input in response thereto, wherein the predetermined operation includes forming a defined group that associates data from decoding encoded data markings from a plurality of objects within the defined group.

7. The wearable scanning device of claim 6, wherein the processor is further configured to:
analyze the subset of the images to detect movement of the encoded data marking to another location within the FOV; and
interpret the movement of the encoded data marking to the another location as receipt of a second input and initiate another predetermined operation associated with the interpreted second input in response thereto.

8. The wearable scanning device of claim 7, wherein the predetermined operation associated with the first input includes indicating a first object that is part of the defined group, and wherein the another predetermined operation associated with the second input includes indicating a last object that is part of the defined group.

9. The wearable scanning device of claim 6, wherein the plurality of objects of the defined group are part of a common group for shipping.

10. A wearable scanning device comprising:
an image sensor configured to capture images of an object present within a field of view (FOV) of the image sensor;
storage configured to store image data representing the images;
a projector configured to project a visual guide for assisting scanning of the object; and
a processor operably coupled to the storage and guide projector, the processor configured to:
operate the projector to project a visual guide to guide movement of the object to cause the encoded data marking to be moved within the FOV;
analyze a subset of the images to detect movement of the encoded data marking to a location within the FOV; and
interpret the movement of the encoded data marking to the location as receipt of a first input and initiate a predetermined operation associated with the interpreted first input in response thereto,
wherein the FOV is logically divided into multiple zones including at least a first zone and a second zone, wherein the first zone includes the location, and wherein the second zone includes another location, and the processor is further configured to:

analyze the subset of the images to detect movement of the encoded data marking to the another location within the second zone of the FOV; and interpret the movement of the encoded data marking to the another location as receipt of a second input and initiate a second predetermined operation associated with the interpreted second input in response thereto.

11. The wearable scanning device of claim 10, wherein the visual guide includes a first appearance within the first zone, and a second appearance within a second zone, wherein the first appearance and the second appearance differ in at least one of a brightness, flashing, color, pattern, shape, or size.

12. The wearable scanning device of claim 10, wherein the visual guide is configured to change its appearance as visual confirmation of successfully moving the encoded data marking within a corresponding zone of the multiple zones.

13. The wearable scanning device of claim 10, wherein the visual guide includes multiple visual guides including a first visual guide associated with the first zone, and a second visual guide associated with the second zone.

14. The wearable scanning device of claim 13, wherein the first visual guide and the second visual guide are projected together to be visible at the same time.

15. The wearable scanning device of claim 13, wherein the first zone and the second zone are separated by an inactive region in which detection of the encoded data marking is not interpreted as an input associated with a corresponding predetermined operation.

16. The wearable scanning device of claim 13, wherein the first zone and the second zone are separated by an inactive region in which detection of the encoded data marking is not interpreted as an input associated with a corresponding predetermined operation.

17. A method of operating a wearable scanning device, the method comprising:
   capturing images by an imager of a wearable scanning device for scanning of an object including an encoded data marking within a field of view (FOV) of the imager;
   projecting a visual guide from the wearable scanning device to assist scanning of the object;
   logically dividing the FOV into multiple zones including at least a first zone and a second zone;
   analyze a subset of the images to detect movement of the encoded data marking to a location within one of the defined zones of the FOV;
   interpreting the movement of the encoded data marking to the location as receipt of an input to the wearable scanning device depending on which of the defined zones the location is determined to be within; and
   initiating a predetermined operation associated responsive to the interpreted input that is selected from a plurality of predetermined operations associated with the different defined zones, and wherein the interpreted input is based on a combination of movements between different zones of the FOV.

18. A method of operating a wearable scanning device, the method comprising:
   capturing images by an imager of a wearable scanning device for scanning of an object including an encoded data marking within a field of view (FOV) of the imager;
   projecting a visual guide from the wearable scanning device to assist scanning of the object;
   logically dividing the FOV into multiple zones including at least a first zone and a second zone;
   analyze a subset of the images to detect movement of the encoded data marking to a location within one of the defined zones of the FOV;
   interpreting the movement of the encoded data marking to the location as receipt of an input to the wearable scanning device depending on which of the defined zones the location is determined to be within; and
   initiating a predetermined operation associated responsive to the interpreted input that is selected from a plurality of predetermined operations associated with the different defined zones, wherein the plurality of predetermined operations include at least one of undoing or deleting a previous operation performed from an earlier movement of the encoded data marking within another zone.

19. A method of operating a wearable scanning device, the method comprising:
   capturing images by an imager of a wearable scanning device for scanning of an object including an encoded data marking within a field of view (FOV) of the imager;
   projecting a visual guide from the wearable scanning device to assist scanning of the object;
   logically dividing the FOV into multiple zones including at least a first zone and a second zone;
   analyze a subset of the images to detect movement of the encoded data marking to a location within one of the defined zones of the FOV;
   interpreting the movement of the encoded data marking to the location as receipt of an input to the wearable scanning device depending on which of the defined zones the location is determined to be within; and
   initiating a predetermined operation associated responsive to the interpreted input that is selected from a plurality of predetermined operations associated with the different defined zones, wherein the plurality of predetermined operations includes making a selection within a menu system.

20. The method of claim 19, wherein making a selection within the menu system includes descending deeper into a submenu of items that may be selected or pulling back out into a higher level menu from within the submenu.

* * * * *